US012644641B2

(12) United States Patent
Kagimoto et al.

(10) Patent No.: US 12,644,641 B2
(45) Date of Patent: Jun. 2, 2026

(54) INSPECTION DEVICE AND INSPECTION SYSTEM FOR COLD INSULATOR

(71) Applicant: PANASONIC INTELLECTUAL PROPERTY MANAGEMENT CO., LTD., Kadoma (JP)

(72) Inventors: Masahiro Kagimoto, Shiga (JP); Shinya Kojima, Kyoto (JP); Akihisa Yoshimura, Shiga (JP); Masato Watanabe, Shiga (JP); Akifumi Miyano, Shiga (JP); Hideji Kawarazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 158 days.

(21) Appl. No.: 18/293,703

(22) PCT Filed: Jun. 6, 2022

(86) PCT No.: PCT/JP2022/022756
    § 371 (c)(1),
    (2) Date: Jan. 30, 2024

(87) PCT Pub. No.: WO2023/042495
    PCT Pub. Date: Mar. 23, 2023

(65) Prior Publication Data
    US 2025/0116454 A1      Apr. 10, 2025

(30) Foreign Application Priority Data
    Sep. 14, 2021    (JP) ................................. 2021-149552

(51) Int. Cl.
    *F25D 29/00*      (2006.01)
    *G01K 1/024*      (2021.01)
    *G01K 3/00*      (2006.01)

(52) U.S. Cl.
    CPC ........... *F25D 29/003* (2013.01); *G01K 1/024* (2013.01); *G01K 3/005* (2013.01); *F25D 2201/14* (2013.01); *F25D 2700/12* (2013.01)

(58) Field of Classification Search
    CPC . F25D 2201/14; F25D 2700/12; F25D 29/003
    See application file for complete search history.

(56) References Cited

U.S. PATENT DOCUMENTS

| | | | | |
|---|---|---|---|---|
| 2011/0115636 A1* | 5/2011 | Zhang | ...................... | H04Q 9/00 374/E1.002 |
| 2016/0138859 A1* | 5/2016 | Stimpfig | ................. | F25D 29/00 62/264 |
| 2023/0131756 A1* | 4/2023 | Kasahara | ............... | G01K 1/143 62/190 |

FOREIGN PATENT DOCUMENTS

| | | |
|---|---|---|
| JP | 2002-087542 | 3/2002 |
| JP | 2019-214446 | 12/2019 |

(Continued)

OTHER PUBLICATIONS

Extended European Search Report issued in European Patent Application No. 22869644.9, Dec. 12, 2024 (10 pages).

(Continued)

*Primary Examiner* — Henry T Crenshaw
(74) *Attorney, Agent, or Firm* — HSML P.C.

(57)      ABSTRACT

An inspection device (12) for a cold insulator (10) includes: an RF reader 50 that receives from an RF tag 30 a detected temperature of a cold insulator in a cold insulation box, the detected temperature being detected by a temperature sensor (20) attached to a surface of the cold insulator; and a controller 61. The controller outputs information indicating a result of comparison between: at least one of a lower limit temperature obtained by adding a predetermined first value to a lowest management temperature of an article that is kept cold in the cold insulation box and an upper limit tempera- (Continued)

ture obtained by subtracting a predetermined second value from a solidification temperature of the cold insulator; and the detected temperature of the cold insulator which has been received by the RF reader.

20 Claims, 7 Drawing Sheets

(56)                    References Cited

FOREIGN PATENT DOCUMENTS

| | | |
|---|---|---|
| KR | 10-2019-0059448 | 5/2019 |
| WO | 2012/017903 | 2/2012 |
| WO | 2017/061067 | 4/2017 |
| WO | 2021/1408834 A1 | 7/2021 |

OTHER PUBLICATIONS

International Search Report of PCT/JP2022/022756, Aug. 23, 2022, 2 pages.

* cited by examiner

INSPECTION DEVICE AND INSPECTION SYSTEM FOR COLD INSULATOR

TECHNICAL FIELD

The present disclosure relates to an inspection device and inspection system for a cold insulator.

BACKGROUND ART

A heat insulating container of PTL 1 is known was a heat insulating container using a conventional cold insulator. The heat insulating container accommodates a vacuum heat insulating panel and a cold storing agent, and a cold insulation space that is thermally insulated by the vacuum heat insulating panel is cooled by the cold storing agent. Moreover, a temperature sensor that detects the temperature of the cold insulation space and a communicator that performs communication of this detection data are located in the heat insulating container.

CITATION LIST

Patent Literature

PTL 1: International Publication No. 2012/017903

SUMMARY OF INVENTION

Technical Problem

For example, transportation of medicine and the like requires severe temperature management in which a low temperature within a predetermined temperature range is maintained for a predetermined period of time regardless of an outside air temperature. The above heat insulating container performs the temperature management of the cold insulation space by performing the communication of the detection data of the temperature sensor.

The temperature of the cold insulation space depends on the temperature of the cold storing agent. However, the temperature management of the cold storing agent is not described in PTL 1. Therefore, when the temperature of the cold storing agent is not within a predetermined temperature range and is too low or too high due to, for example, insufficient freezing of the cold storing agent put into the heat insulating container and insufficient temperature adjustment of the cold storing agent, the cold insulation space cannot be maintained at a predetermined temperature for a predetermined period of time.

The present disclosure was made to solve the above problems, and an object of the present disclosure is to provide an inspection device and inspection system for a cold insulator that can maintain a predetermined temperature environment in a cold insulation space.

Solution to Problem

An inspection device for a cold insulator according to a first aspect of the present invention includes: an RF reader that receives from an RF tag a detected temperature of a cold insulator in a cold insulation box, the detected temperature being detected by a temperature sensor attached to a surface of the cold insulator; and a controller. The controller outputs information indicating a result of comparison between: at least one of a lower limit temperature obtained by adding a predetermined first value to a lowest management temperature of an article that is kept cold in the cold insulation box and an upper limit temperature obtained by subtracting a predetermined second value from a solidification temperature of the cold insulator; and the detected temperature of the cold insulator which has been received by the RF reader. According to this configuration, the temperature of the cold insulator is inspected based on at least one of the lowest management temperature of the article and the solidification temperature of the cold insulator. Therefore, a predetermined temperature environment in a cold insulation space that is kept cold by the cold insulator can be maintained.

The inspection device for the cold insulator according to a second aspect of the present invention is configured such that in the first aspect, each of the first value and the second value is at least one of a temperature difference between temperatures of a center and surface of the cold insulator, a detection error of the temperature sensor, and a value obtained by adding the temperature difference to the detection error.

According to this configuration, the cold insulator is inspected by a temperature that is based on: the lowest management temperature of the article or the solidification temperature of the cold insulator; the temperature difference between the temperatures of the surface and center of the cold insulator; the detection error of the temperature sensor; and a value obtained by addition of these. Thus, for example, it is possible to avoid a case where the temperature of the center of the cold insulator is too low, and the article in the cold insulation box is cooled by the cold insulator, and therefore, the article freezes or causes low temperature deterioration. Moreover, it is possible to avoid a case where the temperature of the center of the cold insulator is too high, and a period of time in which the cold insulation space cooled by the cold insulator is maintained at a predetermined temperature becomes shorter than a predetermined period of time.

The inspection device for the cold insulator according to a third aspect of the present invention is configured such that: in the first or second aspect, when the article is kept cold in the cold insulation box within a cold insulation temperature range including the lowest management temperature as a lower limit, and the cold insulator is a first cold insulator which has been cooled in an environment of a first temperature lower than the cold insulation temperature range and the solidification temperature of the cold insulator and then has been adjusted in temperature in an environment of a second temperature that is within the cold insulation temperature range, the controller outputs information indicating whether or not the detected temperature of the first cold insulator is not less than the lower limit temperature; and when the article is kept cold in the cold insulation box within the cold insulation temperature range including the lowest management temperature as the lower limit, and the cold insulator is a second cold insulator which has been cooled in an environment of a third temperature that is within the cold insulation temperature range and is not more than the solidification temperature of the cold insulator, the controller outputs information indicating whether or not the detected temperature of the second cold insulator is not more than the upper limit temperature. According to this configuration, the cold insulator can be inspected with a higher degree of accuracy in accordance with the method of cooling the cold insulator.

The inspection device for the cold insulator according to a fourth aspect of the present invention is configured such that in the first or second aspect, when a difference between the lower limit temperature and the upper limit temperature is not less than a predetermined value, the controller outputs information indicating whether or not the detected temperature of the cold insulator is not less than the lower limit temperature and not more than the upper limit temperature. According to this configuration, the cold insulator can be more easily inspected regardless of the method of cooling the cold insulator.

The inspection device for the cold insulator according to a fifth aspect of the present invention is configured such that in any one of the first to fourth aspects, as the detected temperature of the cold insulator, the controller uses a temperature corrected by a pre-acquired difference or ratio between a target temperature and the detected temperature detected by the temperature sensor. According to this configuration, the cold insulator can be inspected with a higher degree of accuracy by reducing the detection error. Moreover, since the detected temperature is corrected for each temperature sensor, the difference between the lower limit temperature and the upper limit temperature can be made large, and therefore, the cold insulator can be more easily inspected regardless of the method of cooling the cold insulator.

The inspection device for the cold insulator according to a sixth aspect of the present invention is configured such that in any one of the first to fifth aspects, as the detected temperature of the cold insulator, the controller uses a temperature corrected based on an intensity of a radio wave when the RF tag has received the radio wave transmitted from the RF reader. According to this configuration, the cold insulator can be quickly inspected with a higher degree of accuracy by reducing the detection error.

The inspection device for the cold insulator according to a seventh aspect of the present invention is configured such that: in any one of the first to sixth aspects, the RF tag is of a passive type; and the controller transmits from the RF reader to the RF tag a radio wave having an intensity corresponding to at least a distance between the RF tag and the RF reader. According to this configuration, the accuracy of the detected temperature of the cold insulator which is detected by the temperature sensor is increased, and the cold insulator can be inspected with a higher degree of accuracy.

The inspection device for the cold insulator according to an eighth aspect of the present invention is configured such that: in any one of the first to seventh aspects, the controller acquires by the RF reader, information of the cold insulator which is stored in the RF tag in the cold insulation box; and the controller determines based on the information of the cold insulator whether or not the predetermined cold insulator is being accommodated in the cold insulation box. According to this configuration, the cold insulator can be prevented from being mistakenly put into the cold insulation box, and the cold insulator can be prevented from being forgotten to be put into the cold insulation box.

The inspection device for the cold insulator according to a ninth aspect of the present invention is configured such that in any one of the first to eighth aspects, based on an intensity of a radio wave which has been transmitted from the RF tag in the cold insulation box and received by the RF reader, the controller determines whether or not the cold insulator is being accommodated in the cold insulation box. According to this configuration, the cold insulator can be prevented from being mistakenly put into the cold insulation box, and the cold insulator can be prevented from being forgotten to be put into the cold insulation box.

The inspection device for the cold insulator according to a tenth aspect of the present invention is configured such that in any one of the first to ninth aspects, based on an intensity of a radio wave which has been received by the RF tag in the cold insulation box, the controller determines a state of the cold insulator. According to this configuration, the RSSI of the RF tag when the RF tag has received the radio wave transmitted from the RF reader depends on the state of the cold insulator. Therefore, the inspection of the cold insulator can be performed with a higher degree of accuracy by using the RSSI of the RF tag.

The inspection device for the cold insulator according to an eleventh aspect of the present invention is configured such that in any one of the first to tenth aspects, when the controller determines based on the result of the comparison that the cold insulator is usable, the controller updates the number of times of the use of the cold insulator and stores the number of times of the use in the RF tag. According to this configuration, the use plan of the cold insulator can be more easily executed.

An inspection system for a cold insulator according to a twelfth aspect of the present invention includes: the temperature sensor that detects the temperature of the cold insulator accommodated in the cold insulation box; the RF tag that transmits the detected temperature of the cold insulator which is detected by the temperature sensor; and the inspection device according to any one of the first to eleventh aspects. According to this configuration, the cold insulator can be inspected, and a predetermined cold insulation space can be maintained by the cold insulator.

The above object, other objects, features, and advantages of the present disclosure will be made clear by the following detailed explanation of preferred embodiments with reference to the attached drawings.

DESCRIPTION OF EMBODIMENTS

Hereinafter, an embodiment of the present disclosure will be specifically described with reference to the drawings. In the following description and the drawings, the same reference signs are used for the same or corresponding components, and a repetition of the same explanation is avoided.

Embodiment

Figure 1:
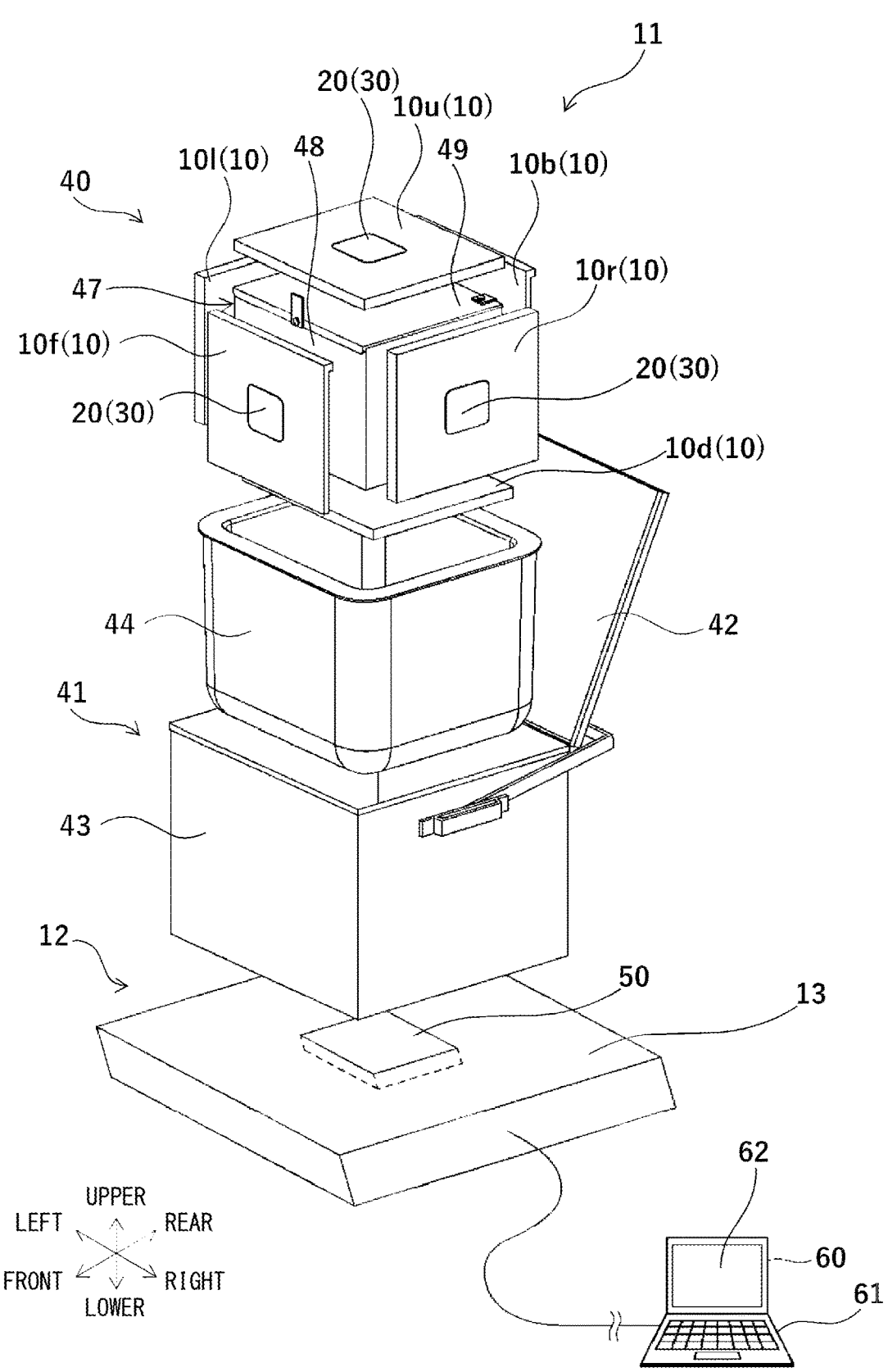
FIG. 1 is a perspective view showing an inspection device and inspection system for a cold insulator according to Embodiment 1 of the present invention.

As shown in FIG. 1, an inspection system 11 for cold insulators 10 according to the embodiment includes: temperature sensors 20 and RF tags 30 which are attached to the cold insulators 10; and an inspection device 12 for the cold insulators 10. The inspection device 12 for the cold insulators 10 inspects the cold insulators 10 based on the temperatures of the cold insulators 10 which are detected by the temperature sensors 20 located in a cold insulation box 40 and are output by the RF tags 30.

Cold Insulation Box

Figure 2:
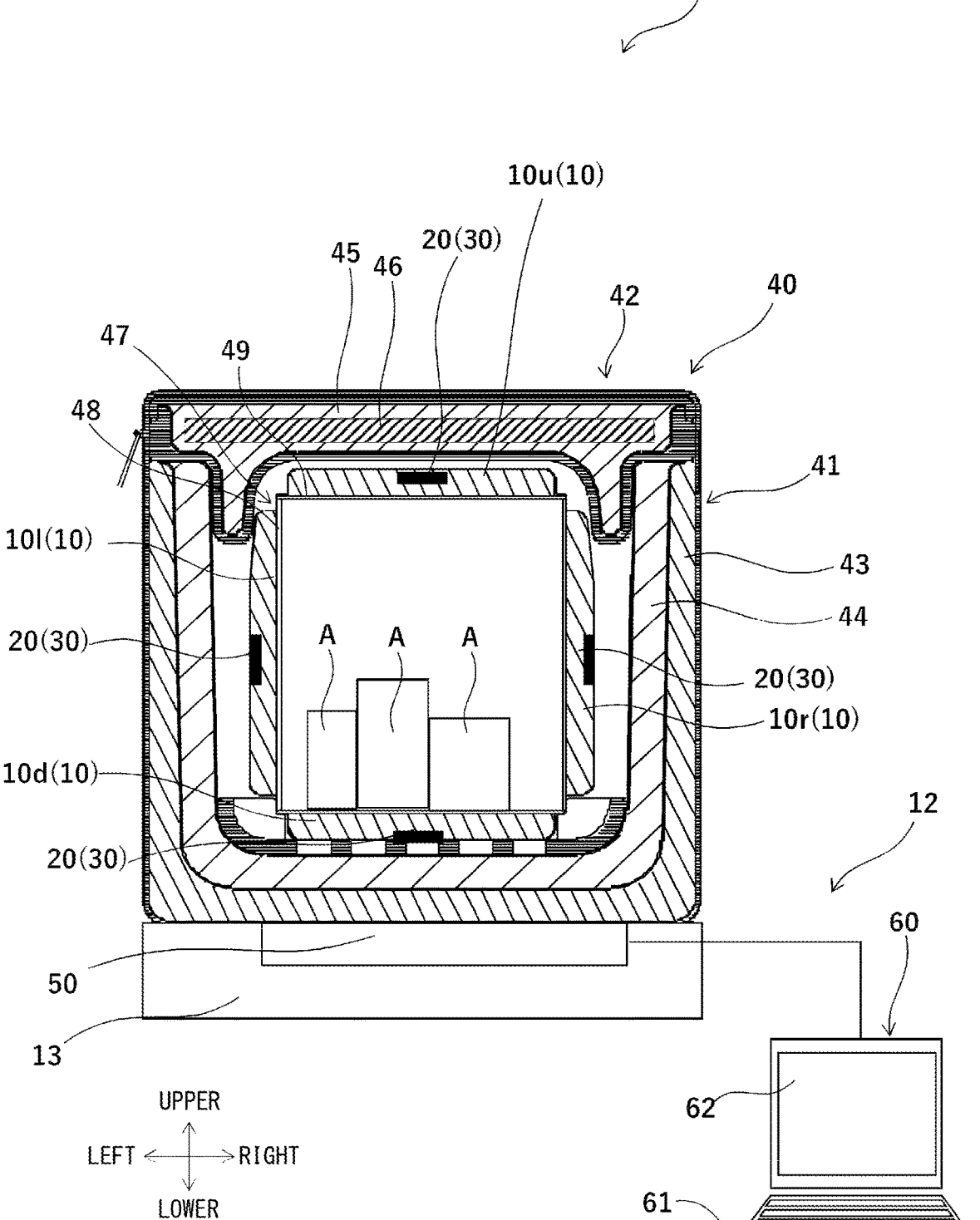
FIG. 2 is a sectional view showing the inspection device and inspection system for the cold insulator.

In an example shown in FIGS. 1 and 2, the cold insulation box 40 includes a cold insulation space that is an internal space thereof. The cold insulation box 40 is used to store or transport an article A, such as medicine, specimen, or food, in the cold insulation space having a predetermined temperature environment. The cold insulation box 40 includes a cold insulation container 41 and a cold insulation lid 42. One side, where the cold insulation lid 42 is located, of the cold insulation container 41 is referred to as an upper side, and its opposite side is referred to as a lower side. Moreover, directions which are orthogonal to an upper-lower direction and are orthogonal to each other are referred to as a left-right direction and a front-rear direction. However, an arrangement direction of the cold insulation box 40 is not limited to this.

The cold insulation container 41 includes a first protective layer 43 and a first vacuum heat insulating body 44. For example, each of the first protective layer 43 and the first vacuum heat insulating body 44 has a box shape including an internal space and an upper opening. The internal space of the first protective layer 43 is larger than the first vacuum heat insulating body 44. The first vacuum heat insulating body 44 is accommodated in the internal space of the first protective layer 43, and the first protective layer 43 covers an outer surface of the first vacuum heat insulating body 44. Therefore, the cold insulation container 41 formed by the first protective layer 43 and the first vacuum heat insulating body 44 has a box shape including an upper opening and a cold insulation space that is an internal space.

The first protective layer 43 is a nonmetal cushioning member, such as styrene foam. The first protective layer 43 prevents the first vacuum heat insulating body 44 and the article A from being damaged by, for example, impact and vibration applied from an outside. The first vacuum heat insulating body 44 includes a core member and an outer covering member and blocks heat conduction between the cold insulation space and the outside. The core member is a nonmetal porous body, such as: an open-cell body, such as open-cell urethane foam; a foamed resin material, such as styrene foam; a fiber assembly; or an inorganic fine particle assembly. The outer covering member is made of a nonmetal material, such as resin, and has a gas barrier property. The outer covering member covers the core member and maintains its internal pressure such that the internal pressure is lower than atmospheric pressure.

The cold insulation lid 42 includes a second protective layer 45 and a second vacuum heat insulating body 46 and has, for example, a flat plate shape. The second vacuum heat insulating body 46 has a flat plate shape, and the second protective layer 45 covers an outer surface of the second vacuum heat insulating body 46 and protects the second vacuum heat insulating body 46. As with the first protective layer 43, the second protective layer 45 is a nonmetal cushioning member. The second vacuum heat insulating body 46 includes a core member and a covering member which are similar to those of the first vacuum heat insulating body 44. A metal film may be used as the covering member of the second vacuum heat insulating body 46.

The cold insulation lid 42 is larger than the upper opening of the cold insulation container 41 and is located so as to be able to open and close the upper opening of the cold insulation container 41. When the cold insulation lid 42 opens the upper opening of the cold insulation container 41, the article A can be taken out from or can be put into the cold insulation space through the upper opening of the cold insulation container 41. When the cold insulation lid 42 closes the upper opening of the cold insulation container 41, the cold insulation space of the cold insulation container 41 is sealed.

Accommodating Box and Cold Insulator

An accommodating box 47 and the cold insulators 10 are accommodated in the cold insulation box 40. The accommodating box 47 is a container that accommodates the article A, such as medicine, in the cold insulation space. The accommodating box 47 may not be accommodated in the cold insulation box 40, and the article A may be directly accommodated in the cold insulation box 40 without through the accommodating box 47.

The accommodating box 47 includes an accommodating container 48 and an accommodating lid 49. The accommodating container 48 has a box shape including an upper end that is open. The accommodating lid 49 has a flat plate shape and is attached to the upper end of the accommodating container 48 so as to be able to open and close an upper end opening of the accommodating container 48. The accommodating box 47 is smaller than the cold insulation space of the cold insulation box 40, and there is a gap between an inner surface of the cold insulation box 40 and an outer surface of the accommodating box 47.

For example, the cold insulator 10 is formed in such a manner that a material prepared by adding an additive for gelation and an additive for adjustment of a melting point or a freezing point to paraffin and water is enclosed in a resin container. Radio waves can pass through the cold insulator 10 by the paraffin and the resin container. Moreover, for example, the cold insulator 10 has a flat plate shape and is located between the inner surface of the cold insulation box 40 and an inner surface of the accommodating box 47. For example, the six cold insulators 10 include a lower cold insulator 10d, an upper cold insulator 10u, a right cold insulator 10r, a left cold insulator 101, a front cold insulator 10f, and a rear cold insulator 10b in accordance with arrangement positions in the cold insulation box 40. The inner surface of the cold insulation box 40 which surrounds the cold insulation space of the cold insulation box 40 includes a lower inner surface, an upper inner surface, a right inner surface, a left inner surface, a front inner surface, and a rear inner surface. The outer surface of the accommodating box 47 includes a lower outer surface, an upper outer surface, a right outer surface, a left outer surface, a front outer surface, and a rear outer surface.

The lower cold insulator 10d is located between the lower inner surface of the cold insulation box 40 and the opposing lower outer surface of the accommodating box 47. The upper cold insulator 10u is located between the upper inner surface of the cold insulation box 40 and the opposing upper outer surface of the accommodating box 47. The right cold insulator 10r is located between the right inner surface of the cold insulation box 40 and the opposing right outer surface of the accommodating box 47. The left cold insulator 101 is located between the left inner surface of the cold insulation box 40 and the opposing left outer surface of the accommodating box 47. The front cold insulator 10f is located between the front inner surface of the cold insulation box 40 and the opposing front outer surface of the accommodating box 47. The rear cold insulator 10b is located between the rear inner surface of the cold insulation box 40 and the opposing rear outer surface of the accommodating box 47.

Moreover, there may be plural types of cold insulators 10 (for example, a first cold insulator 10 and a second cold insulator 10) depending on its freezing method. The first cold insulator 10 is a cold insulator 10 which has been cooled in an environment of a first temperature that is lower than a cold insulation temperature range of the cold insulation box 40 and a solidification temperature of the first cold insulator 10, and then, has been adjusted in temperature in an environment of a second temperature that is within the cold insulation temperature range. The second cold insulator 10 is a cold insulator 10 which has been cooled in an environment of a third temperature that is within the cold insulation temperature range and is not more than the solidification temperature of the second cold insulator 10.
Temperature Sensor, RF Tag The temperature sensor 20 and the RF tag 30 are attached to the cold insulator 10. The temperature sensor 20 is fixed to a predetermined position on a surface of the cold insulator 10. For example, in a plan view of the cold insulator 10, the temperature sensor 20 is located on the cold insulator 10 so as to overlap a center of the cold insulator 10. In the example of FIG. 2, when the cold insulator 10 is located between the inner surface of the cold insulation box 40 and the outer surface of the accommodating box 47, the temperature sensor 20 is attached to an outer surface of the cold insulator 10 which is opposed to the inner surface of the cold insulation box 40. When the outer surface of the cold insulator 10 is viewed from the outside, the temperature sensor 20 is located at a position that overlaps the center of the cold insulator 10. Therefore, the temperature sensor 20 is located at a position on the cold insulator 10 which is closest to the center of the cold insulator 10. The temperature sensor 20 may be attached to an inner surface of the cold insulator 10 which is opposed to the outer surface of the accommodating box 47.

Figure 3:
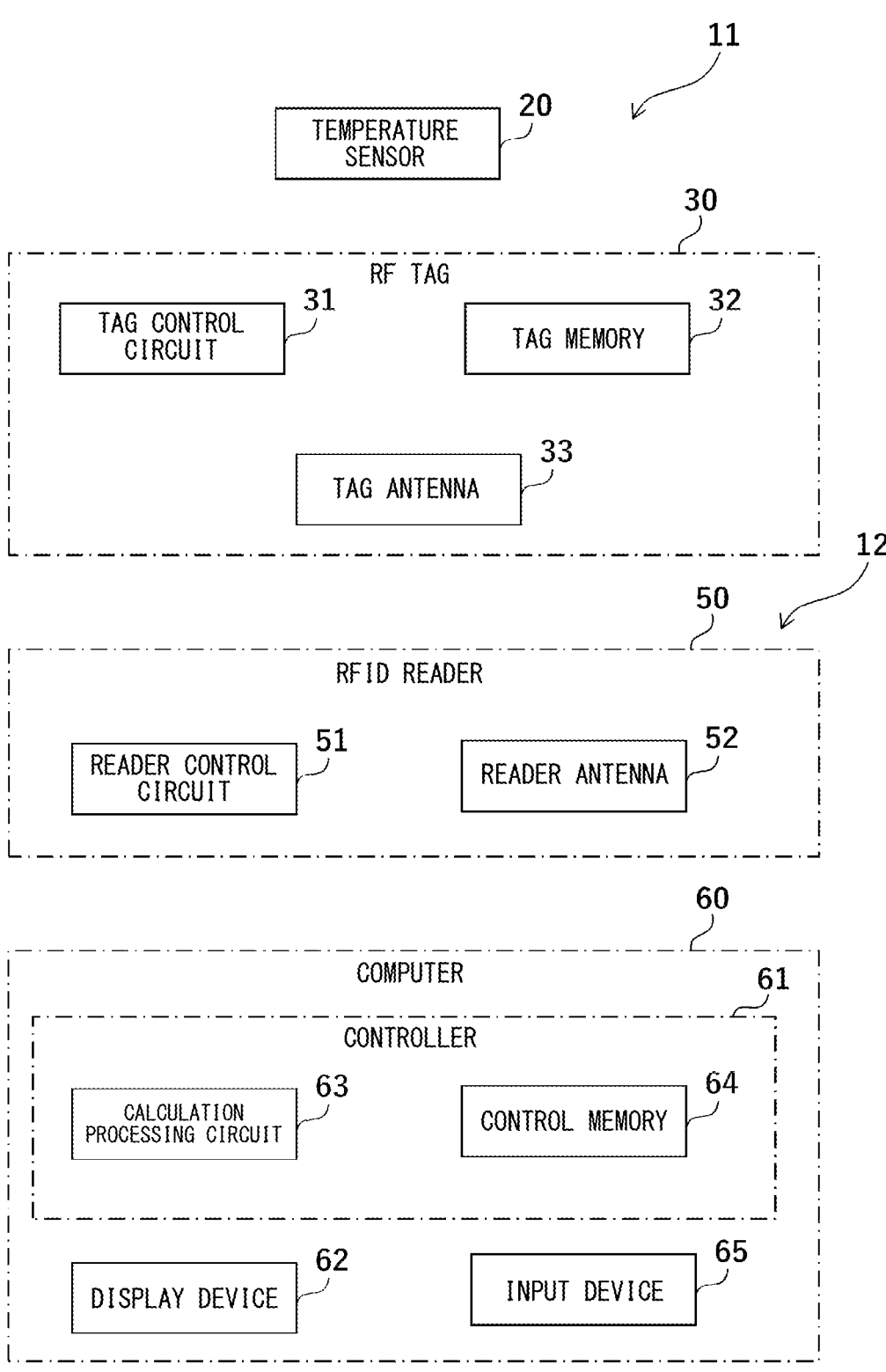
FIG. 3 is a functional block diagram showing the configurations of the inspection device and inspection system for the cold insulator.

As shown in FIG. 3, examples of the temperature sensor 20 include a thermocouple, a resistance temperature device, and a thermistor, and the temperature sensor 20 detects the temperature of the surface of the cold insulator 10. The temperature sensor 20 is electrically connected to the RF tag 30, and the detected temperature of the cold insulator 10 which is detected by the temperature sensor 20 is output to the RF tag 30. The temperature sensor 20 may be integrated with the RF tag 30 to form a unit or may be connected to the RF tag 30 through a lead wire or the like.

For example, the RF tag 30 is of a passive type and includes a tag control circuit 31 that is a control circuit, a tag memory 32 that is a memory, and a tag antenna 33 that is an antenna. The tag memory 32 prestores identification information of the cold insulator 10 to which the RF tag 30 is attached and identification information of the RF tag 30. The tag control circuit 31 transmits the detected temperature detected by the temperature sensor 20 and the pieces of identification information from the tag antenna 33 by radio waves. The type of the RF tag 30 is not limited to the passive type and may be an active type or a semi-active type.
Inspection Device for Cold Insulators The inspection device 12 for the cold insulators 10 includes an RF reader 50 and a controller 61. For example, the RF reader 50 is fitted in a recess that is recessed from an upper surface of a base 13. An upper surface of the RF reader 50 appears from the upper surface of the base 13 so as to be flush with the upper surface of the base 13. The cold insulation box 40 accommodating the cold insulators 10 as inspection targets is placed on the upper surface of the base 13. Thus, a lower surface of the cold insulation box 40 is opposed to the RF reader 50, and the cold insulators 10 in the cold insulation box 40 are located at one side, where the RF reader 50 is located, of the cold insulation lid 42.

The RF reader 50 includes a reader control circuit 51 that is a control circuit and a reader antenna 52 that is an antenna, and has a reading function of reading information from the RF tag 30. In addition to the reading function, the RF reader 50 may have a writing function of writing information to the RF tag 30. The RF reader 50 is connected to a computer 60 at an outside of the cold insulation box 40. The RF reader 50 receives the information from the RF tag 30 through the reader antenna 52 by radio waves and outputs the information to the computer 60.

The computer 60 includes the controller 61, a display device 62, and an input device 65. The controller 61 includes a calculation processing circuit 63 and a control memory 64 that is a memory. The control memory 64 is a recording medium, such as a RAM or a ROM, which is accessible from the calculation processing circuit 63. The control memory 64 stores the information acquired from the RF tag 30 and a predetermined program.

The calculation processing circuit 63 includes, for example, a processor such as a CPU, and executes the program stored in the control memory 64 to execute various types of processing. For example, the controller 61 receives from the RF reader 50 the information of the cold insulator 10 which is supplied from the RF tag 30. Based on this information, the controller 61 inspects the cold insulator 10 or displays the information of the cold insulator 10 on the display device 62.

The display device 62 is, for example, a display and displays the information supplied from the controller 61. The input device 65 includes, for example, a keyboard and a mouse, and is operated by a user to input the information to the controller 61.
Operation of RFID The RF reader 50 transmits an acquisition signal from the reader antenna 52 by a radio wave. The acquisition signal is a signal for acquiring the temperature of the cold insulator 10. The RF tag 30 receives by the tag antenna 33 the radio wave transmitted from the RF reader 50. Thus, electric power is generated at the tag antenna 33 of the RF tag 30 by rectification, resonance, or the like.

By this electric power, a current flows through the tag control circuit 31 and the temperature sensor 20. Then, the temperature sensor 20 detects the temperature of the surface of the cold insulator 10 to which the temperature sensor 20 is attached. The tag control circuit 31 of the RF tag 30 transmits the detected temperature detected by the temperature sensor 20 and the identification information stored in the tag memory 32 from the tag antenna 33 by radio waves. The reader control circuit 51 of the RF reader 50 receives the detected temperature and identification information of the cold insulator 10 and the identification information of the RF tag 30, which are supplied from the RF tag 30, by the reader antenna 52 and outputs them to the computer 60.
Method of Inspecting Cold Insulator For example, a cold insulation environment in the cold insulation space of the cold insulation box 40 includes a cold insulation temperature range that is the temperature of the cold insulation space and a cold insulation time that is a period of time in which the cold insulation temperature range is maintained. The cold insulation temperature range is predetermined in accordance with the article A, such as medicine, accommodated in the cold insulation space. The cold insulation time is predetermined in accordance with a period of time in which the article A is transported.

For example, as the cold insulation environment when the article A is accommodated in the cold insulation box 40 and transported from Japan to Europe, the cold insulation temperature range of not less than 2° C. and not more than 8° C. and the cold insulation time of five days or more are predetermined. The cold insulation temperature range is not less than a lowest management temperature Tf of the article A and not more than a highest management temperature of the article A. The lowest management temperature Tf is higher than a solidification temperature at which the article A freezes. For example, the lowest management temperature Tf is 2° C. The highest management temperature is lower than a temperature at which heat deterioration of the article A occurs.

To realize the above predetermined cold insulation environment, the temperatures of the cold insulators 10 that cool the cold insulation space are managed. To be specific, when the temperatures of the cold insulators 10 are too low, the temperature of the cold insulation space becomes lower than the predetermined cold insulation temperature range. Thus, the article A may be excessively cooled in the cold insulation space, and the temperature of the article A may become lower than the predetermined lowest management temperature Tf of the article A. Therefore, the article A may freeze, or low temperature deterioration of the article A may occur.

Then, after the cold insulators 10 are accommodated in the cold insulation box 40 and before the article A is accommodated, the cold insulators 10 in the cold insulation box 40 are inspected by the inspection device 12. When the first cold insulator 10 is used as the cold insulator 10, the controller 61 outputs, in the inspection, information indicating the result of the comparison between a lower limit temperature Tl and the detected temperature of the cold insulator 10 which is received by the RF reader 50. The lower limit temperature Tl is obtained by adding a predetermined first value to the lowest management temperature Tf of the article A that is kept cold in the cold insulation box 40. For example, the first value is a value obtained by adding a temperature difference Te to a detection error Ts of the temperature sensor 20. The temperature difference Te is a difference between the temperatures of the center and surface of the cold insulator 10.

Specifically, the first cold insulator 10 is left as it is in an environment in a freezer of −25° C. that is the first temperature, for 24 hours that is a first period of time. Thus, the first cold insulator 10 is cooled to a temperature lower than the cold insulation temperature range and a solidification temperature Tm, and rapidly freezes. For example, the solidification temperature Tm of the first cold insulator 10 is 5.4° C. that is within the cold insulation temperature range.

Then, the first cold insulator 10 is moved from the freezer to a temperature-controlled warehouse and is left as it is in an environment in the temperature-controlled warehouse having a second temperature that is not less than 3° C. and not more than 5° C., for 24 hours that is a second period of time. Thus, with the first cold insulator 10 in a frozen state, the temperature of the first cold insulator 10 increases. Then, the first cold insulator 10 whose temperature has been adjusted is accommodated in the cold insulation box 40.

In the temperature-controlled warehouse, the temperature of the first cold insulator 10 increases. At this time, the second temperature in the temperature-controlled warehouse is higher than the temperature of the first cold insulator 10 which has been cooled in the environment of the first temperature. Therefore, the first cold insulator 10 increases in temperature from its surface that is in contact with the temperature environment in the temperature-controlled warehouse. Thus, the temperature of the surface of the first cold insulator 10 becomes higher than the temperature of the center of the first cold insulator 10. Therefore, the detected temperature detected by the temperature sensor 20 attached to the surface of the first cold insulator 10 becomes higher than the temperature of the center of the first cold insulator 10. Moreover, the detected temperature detected by the temperature sensor 20 may include an error.

The temperature difference Te between the temperatures of the center and surface of the first cold insulator 10 is predetermined based on an experiment, a simulation, or the like, and is, for example, 1.0° C. Moreover, the detection error Ts of the temperature sensor 20 is predetermined based on an experiment, a simulation, or the like, and is, for example, 0.5° C. The lowest management temperature Tf of the article A is 2.0. In this case, the lower limit temperature Tl in the determination is 3.5 obtained by a formula "Tl=Tf+Te+Ts."

The detected temperature of the first cold insulator 10 in the cold insulation box 40 which is detected by the temperature sensor 20 is compared with the lower limit temperature Tl. Thus, for example, there is a possibility that when the detected temperature is lower than the lower limit temperature Tl, the temperature of the center of the first cold insulator 10 is lower than the lowest management temperature Tf. In this case, the temperature of the cold insulation space that is cooled by the first cold insulator 10 may become lower than the cold insulation temperature range, and the article A may freeze. Therefore, it is determined that the first cold insulator 10 is unusable. On the other hand, when the detected temperature of the first cold insulator 10 which is detected by the temperature sensor 20 is not less than the lower limit temperature Tl, the temperature of the center of the first cold insulator 10 is not less than the lowest management temperature Tf. Therefore, it is determined that the first cold insulator 10 is usable.

The temperature difference Te of the cold insulator 10 may be acquired from the temperature of the surface of the cold insulator 10 which has been detected by the temperature sensor 20 at the time of the inspection, an ambient temperature around the cold insulator 10 at the time of the cooling before the inspection, and the like. In this case, the controller 61 may acquire the temperature difference Te based on the detected temperature detected by the temperature sensor 20 at the time of the inspection and the ambient temperature by using calculation, such as a thermal network formula, or a simulation.

For example, while the temperature of the cold insulator 10 is being adjusted in the temperature-controlled warehouse, the ambient temperature is detected by the temperature sensor 20 or another temperature sensor which is included in the temperature-controlled warehouse and is not the temperature sensor 20. This temperature sensor included in the temperature-controlled warehouse is electrically connected to the controller 61, detects a temperature in the temperature-controlled warehouse as the ambient temperature, and outputs the temperature to the controller 61. Moreover, the temperature sensor 20 outputs the detected temperature as the ambient temperature from the RF tag 30 to the controller 61 through the RF reader 50 located inside or in the vicinity of the temperature-controlled warehouse. The ambient temperature may be a single value or may include a plurality of values. When the ambient temperature includes a plurality of values, the ambient temperature may be transition data of the temperatures continuously detected by the temperature sensor 20 or the temperature sensor included in the temperature-controlled warehouse while the temperature of the cold insulator 10 is being adjusted.

Moreover, the temperature difference Te of the cold insulator 10 may be acquired from, for example, a time-lapse change rate of the temperature of the surface of the cold insulator 10. For example, the controller 61 detects the temperature of the cold insulator 10 by the temperature sensor 20 for every predetermined period of time. When this change rate of the temperature becomes not more than a predetermined value (for example, 1° C./minute), the controller 61 regards that the amount of heat released from the surface of the cold insulator 10 and the amount of heat transferred from the center of the cold insulator 10 to the surface of the cold insulator 10 are in a balanced state. Therefore, the controller 61 may acquire the temperature difference Te based on heat conductance that is based on a physical property value of the cold insulator 10. When the temperature difference Te is negligibly small, each of the first value and a below-described second value may be regarded as the detection error Ts of the temperature sensor 20.

Moreover, the temperature difference Te of the cold insulator 10 may be acquired based on a cold insulation temperature in the cold insulation box 40 accommodating the cold insulator 10. For example, the cold insulation temperature is detected by another temperature sensor which is not the temperature sensor 20 and is included in the cold insulation box 40 accommodating the cold insulator 10. The controller 61 may calculate the amount of heat released from the surface of the cold insulator 10 based on the detected temperature detected by the temperature sensor included in the cold insulation box 40 and may acquire the temperature difference Te based on the amount of heat released.

Method of Controlling Inspection Device for Cold Insulators

Figure 4:
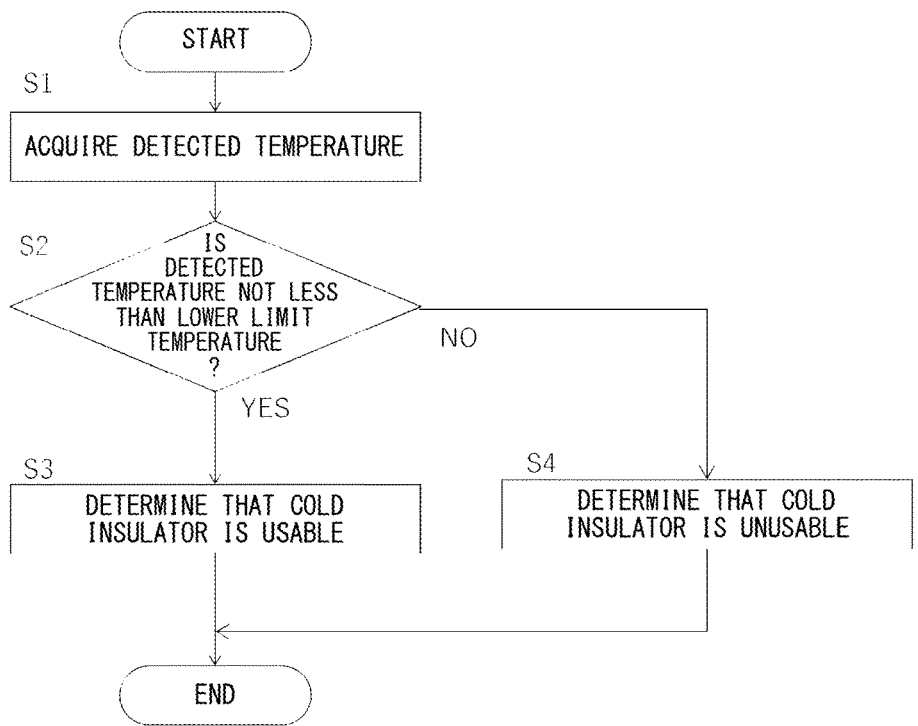
FIG. 4 is a flowchart showing one example of a method of inspecting a first cold insulator.

When there are plural types of cold insulators 10, the controller 61 determines whether or not the type of the cold insulator 10 is the first cold insulator 10. For example, the user inputs the type of the cold insulator 10 to the controller 61 by the input device 65, or the type of the cold insulator 10 is input from the RF tag 30, which prestores the type of the cold insulator 10, through the RF reader 50 to the controller 61. When the type of the cold insulator 10 is the first cold insulator 10, the controller 61 inspects the cold insulator 10 in accordance with the flowchart shown in FIG. 4, for example. When the plural types of cold insulators 10 do not exist, the type of the cold insulator 10 is not determined, and Step S1 is executed.

For example, the first cold insulator 10 is cooled for the first period of time in the freezer that has been set to the first temperature. Then, the first cold insulator 10 is adjusted in temperature for the second period of time in the temperature-controlled warehouse that has been set to the second temperature. After that, the first cold insulator 10 is accommodated in the cold insulation box 40. After the first cold insulator 10 is accommodated and before the article A is accommodated, the controller 61 makes the RF reader 50 transmit the acquisition signal. Thus, a current flows through the temperature sensor 20 and the RF tag 30. Then, the temperature sensor 20 detects the temperature of the surface of the first cold insulator 10, and the RF tag 30 associates the detected temperature of the first cold insulator 10 which is detected by the temperature sensor 20, with the identification information of the first cold insulator 10 and the identification information of the RF tag 30, and transmits it.

The RF reader 50 receives the information from the RF tag 30, and the controller 61 acquires and stores this information (Step S1).

The controller 61 compares the detected temperature of the first cold insulator 10 with the lower limit temperature Tl and outputs information indicating the result of this comparison. For example, the controller 61 determines whether or not the detected temperature of the first cold insulator 10 is not less than the lower limit temperature Tl (Step S2) and outputs the result of this determination.

The controller 61 outputs information indicating whether or not the detected temperature of the first cold insulator 10 is not less than the lower limit temperature Tl. In this case, when the detected temperature is not less than the lower limit temperature Tl (Yes in Step S2), the temperature of the center of the first cold insulator 10 is not less than the lowest management temperature Tf of the article A even in consideration of the temperature difference Te of the first cold insulator 10 and the detection error Ts of the temperature sensor 20. Therefore, the controller 61 determines that since the freezing of the article A by the first cold insulator 10 is being suppressed, the first cold insulator 10 is usable (Step S3).

On the other hand, there is a possibility that when the detected temperature of the first cold insulator 10 is less than the lower limit temperature Tl (No in Step S2), the temperature of the center of the first cold insulator 10 is less than the lowest management temperature Tf of the article A. Therefore, the controller 61 determines that since the article A may freeze by the first cold insulator 10, the first cold insulator 10 is unusable (Step S4).

Then, the controller 61 displays the detected temperature and identification information of the first cold insulator 10 and the result of the determination on the display device 62. Thus, the user can easily recognize whether or not the first cold insulator 10 is usable.

Then, the controller 61 inspects all the first cold insulators 10 accommodated in the cold insulation box 40. When it is determined that all the first cold insulators 10 are usable, the cold insulation box 40 is usable. Then, the article A, such as medicine, is accommodated in the cold insulation box 40, and the cold insulation box 40 can be used. On the other hand, when there is the first cold insulator 10 that has been determined as unusable, this first cold insulator 10 is replaced with a new first cold insulator 10, and this new first cold insulator 10 newly accommodated in the cold insulation box 40 is inspected.

The temperature sensor 20 may detect the temperature of the first cold insulator 10 plural times, and the controller 61 may inspect the first cold insulator 10 based on the detected temperatures. In this case, the RF reader 50 transmits the acquisition signal at a predetermined time interval. In accordance with the acquisition signal, the temperature sensor 20 detects the temperature of the first cold insulator 10 and transmits the temperature by the RF tag 30. This is repeated plural times, and the controller 61 may acquire the detected temperatures and compare an average value of the detected temperatures with the lower limit temperature Tl. Or, each time the controller 61 acquires the detected temperature, the controller 61 may compare the detected temperature with the lower limit temperature Tl, and when the detected temperature is not less than the lower limit temperature a predetermined number of times or more, the controller 61 may determine that the first cold insulator 10 is usable.

The above predetermined number of times may be determined based on, for example, statistical information of the dispersion of the temperatures of the cold insulators 10 which are detected by the temperature sensor 20. In this case, the predetermined number of times may be determined such that the dispersion of the detected temperatures of the cold insulator 10 coincides with the dispersion defined by a predetermined probability density function. Or, an approximation formula indicating a relation between the number of times of the inspection of a RSSI of the RF tag 30 and an increased temperature by heat generation of the RF tag 30 may be acquired, and the number of times of the inspection may be set to the minimum number of times that this approximation formula is applicable.

Moreover, in the foregoing, after the first cold insulators 10 are accommodated and before the article A is accommodated, the inspection device 12 inspects the cold insulators 10 accommodated in the cold insulation box 40. However, a method of inspecting the cold insulators 10 is not limited to this. When the inspection device 12 detects that the cold insulator 10 is being cooled, based on the detected temperature of the cold insulator 10 which is detected by the temperature sensor 20, output from the RF tag 30, and acquired by the RF reader 50, the inspection device 12 may automatically inspect the cold insulator 10.

Modified Example 1

The inspection device 12 for the cold insulators 10 according to Modified Example 1 is configured such that in the above embodiment, when the article A is kept cold in the cold insulation box 40 having a predetermined cold insulation temperature range, and the cold insulator 10 is the second cold insulator 10 which has been cooled in the environment of the third temperature that is within the cold insulation temperature range and is not more than the solidification temperature of the cold insulator 10, the controller 61 outputs information indicating whether or not the detected temperature of the second cold insulator 10 is not more than an upper limit temperature.
Method of Inspecting Cold Insulator To realize a predetermined cold insulation environment, the temperature of the second cold insulator 10 which cools the cold insulation space of the cold insulation box 40 is managed. To be specific, when the freezing of the second cold insulator 10 is inadequate, and the temperature of the second cold insulator 10 is too high, a period of time in which the cooling effect of the second cold insulator 10 lasts may decrease, and the cold insulation time in which the cold insulation space is maintained within the predetermined cold insulation temperature range may become shorter than a predetermined cold insulation time. Thus, the temperature of the article A may become higher than the predetermined highest management temperature of the article A.

Therefore, after the second cold insulators 10 are accommodated in the cold insulation box 40 and before the article A is accommodated, the second cold insulators 10 are inspected in the cold insulation box 40 by the inspection device 12. In this inspection, the controller 61 compares an upper limit temperature Th with the detected temperature of the cold insulator 10 which is detected by the temperature sensor 20 and received by the RF reader 50, and outputs information indicating the result of this comparison. The upper limit temperature Th is obtained by subtracting the second value from the solidification temperature Tm of the second cold insulator 10. For example, the second value is a value obtained by adding the temperature difference Te between the temperatures of the center and surface of the second cold insulator 10 to the detection error Ts of the temperature sensor 20.

Specifically, for example, the second cold insulator 10 is left as it is in an environment in a refrigerator of not less than 2° C. and not more than 3° C. which is the third temperature, for 120 hours that is a third period of time. For example, the third temperature is within the cold insulation temperature range of not less than 2° C. and not more than 8° C., is not more than 5.4° C. that is the solidification temperature Tm of the second cold insulator 10, and is higher than the first temperature at which the second cold insulator 10 rapidly freezes. The third period of time is longer than the first period of time in which the second cold insulator 10 rapidly freezes, and is predetermined based on an experiment, a simulation, or the like as a period of time in which the second cold insulator 10 freezes at the third temperature.

Thus, the temperature of the second cold insulator 10 decreases. In this case, since the third temperature in the refrigerator is lower than the temperature of the second cold insulator 10, the second cold insulator 10 decreases in temperature from its surface that is in contact with the temperature environment in the refrigerator. Therefore, the temperature of the surface of the second cold insulator 10 becomes lower than the temperature of the center of the second cold insulator 10. Thus, the detected temperature detected by the temperature sensor 20 attached to the surface of the second cold insulator 10 becomes lower than the temperature of the center of the second cold insulator 10. Moreover, the detected temperature detected by the temperature sensor 20 may include an error.

The temperature difference Te between the temperatures of the center and surface of the second cold insulator 10 is predetermined based on an experiment, a simulation, or the like, and is, for example, 1.0° C. Moreover, the detection error Ts of the temperature sensor 20 is also predetermined based on an experiment, a simulation, or the like, and is, for example, 0.5° C. The solidification temperature Tm of the second cold insulator 10 is 5.4° C. In this case, the upper limit temperature Th in the determination is 3.9 obtained by a formula "$Th = Tm - Te - Ts$."

Figure 5:
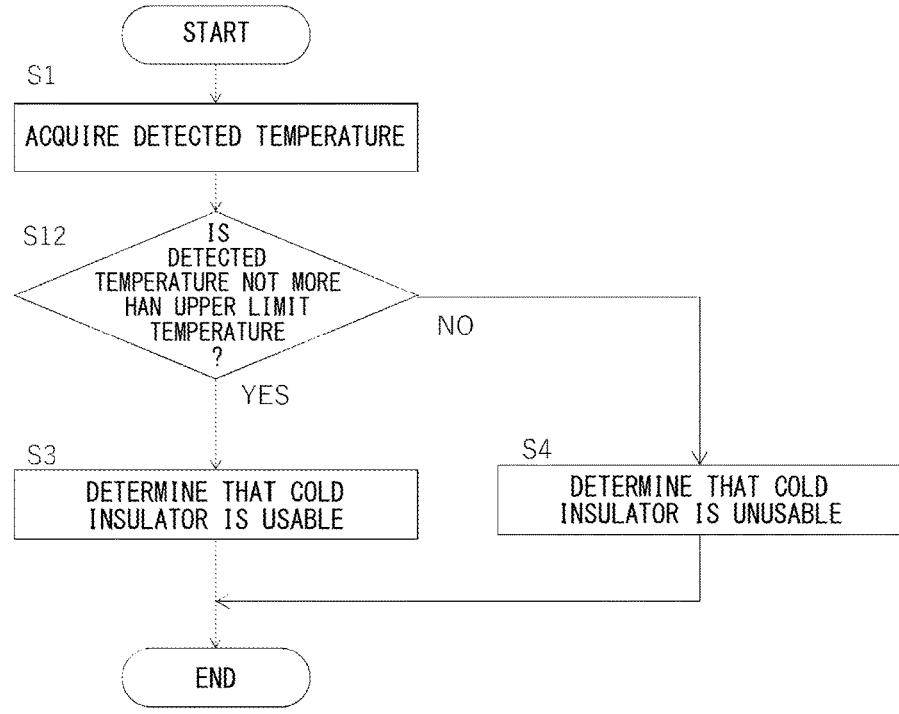
FIG. 5 is a flowchart showing one example of a method of inspecting a second cold insulator.

The detected temperature of the second cold insulator 10 in the cold insulation box 40 which is detected by the temperature sensor 20 is compared with the upper limit temperature Th, and the result of this comparison is output. For example, there is a possibility that when the detected temperature is higher than the upper limit temperature Th, the temperature of the center of the second cold insulator 10 is higher than the solidification temperature Tm of the second cold insulator 10. In this case, there is a possibility that the freezing of the second cold insulator 10 is inadequate. Therefore, the cold insulation time in which the cold insulation space cooled by the second cold insulator 10 is maintained within the cold insulation temperature range may become shorter than the predetermined cold insulation time. Moreover, the temperature of the article A may become higher than the highest management temperature. Therefore, it is determined that the second cold insulator 10 is unusable. On the other hand, when the detected temperature of the second cold insulator 10 which is detected by the temperature sensor 20 is not more than the upper limit temperature Th, the temperature of the center of the second cold insulator 10 is not more than the solidification temperature Tm, and the freezing of the second cold insulator 10 is being completed. Therefore, it is determined that the second cold insulator 10 is usable.
Method of Controlling Inspection Device for Cold Insulators When there are plural types of cold insulators 10, the controller 61 determines whether or not the type of the cold insulator 10 is the second cold insulator 10. For example, the user inputs the type of the cold insulator 10 to the controller 61 by the input device 65, or the type of the cold insulator 10 is input from the RF tag 30, which prestores the type of the cold insulator 10, through the RF reader 50 to the controller 61. When the type of the cold insulator 10 is the second cold insulator 10, the controller 61 inspects the cold insulator 10 in accordance with the flowchart shown in FIG. 5, for example. When the plural types of cold insulators 10 do not exist, the type of the cold insulator 10 is not determined, and Step S1 is executed. Moreover, in FIG. 5, Step S12 is executed instead of Step S2 of FIG. 4.

Specifically, the second cold insulator 10 is cooled in the refrigerator that has been set to the third temperature that is not less than 2° C. and not more than 3° C., for 120 hours that is the third period of time, and is then accommodated in the cold insulation box 40. After the second cold insulator 10 is accommodated and before the article A is accommodated, the controller 61 acquires from the RF reader 50 the detected temperature and identification information of the second cold insulator 10 and the identification information of the RF tag 30 which are supplied from the RF tag 30, and stores them (Step S1).

The controller 61 compares the detected temperature of the second cold insulator 10 with the upper limit temperature Th and outputs information indicating the result of this comparison. For example, the controller 61 determines whether or not the detected temperature of the second cold insulator 10 is not more than the upper limit temperature Th (Step S12), and outputs information indicating this determination.

When the detected temperature is not more than the upper limit temperature Th (Yes in Step S12), the temperature of the center of the second cold insulator 10 is not more than the solidification temperature Tm of the second cold insulator 10 even in consideration of the temperature difference Te of the second cold insulator 10 and the detection error Ts of the temperature sensor 20. Therefore, the controller 61 determines that since the freezing of the second cold insulator 10 is being completed, and the cold insulation time can be maintained, the second cold insulator 10 is usable (Step S3).

On the other hand, there is a possibility that when the detected temperature of the second cold insulator 10 is higher than the upper limit temperature Th (No in Step S12), the temperature of the center of the second cold insulator 10 is higher than the solidification temperature Tm. Therefore, the controller 61 determines that since the second cold insulator 10 may not be freezing entirely, the second cold insulator 10 is unusable (Step S4).

Then, the controller 61 displays the detected temperature and identification information of the second cold insulator 10 and the result of the determination on the display device 62. Thus, the user can easily recognize whether or not the second cold insulator 10 is usable. Then, the controller 61 inspects all the second cold insulators 10 accommodated in the cold insulation box 40. When all the second cold insulators 10 are usable, it is determined that the cold insulation box 40 is usable.

The temperature sensor 20 may detect the temperature of the second cold insulator 10 plural times, and the controller 61 may inspect the second cold insulator 10 based on the detected temperatures. In this case, the controller 61 may acquire the detected temperatures and compare an average value of the detected temperatures with the upper limit temperature Th. When the average value is not more than the upper limit temperature Th, the controller 61 may determine that the second cold insulator 10 is usable. Or, each time the controller 61 acquires the detected temperature, the controller 61 may compare the detected temperature with the upper limit temperature Th, and when the detected temperature is not more than the upper limit temperature Th a predetermined number of times or more, the controller 61 may determine that the second cold insulator 10 is usable.

Modified Example 2

The inspection device 12 for the cold insulators 10 according to Modified Example 2 is configured such that in the above embodiment, when the difference between the lower limit temperature Tl and the upper limit temperature Th is a predetermined value or more, the controller 61 outputs information indicating whether or not the detected temperature of the cold insulator 10 is not less than the lower limit temperature Tl and not more than the upper limit temperature Th.

Method of Controlling Inspection Device for Cold Insulators

Figure 6:
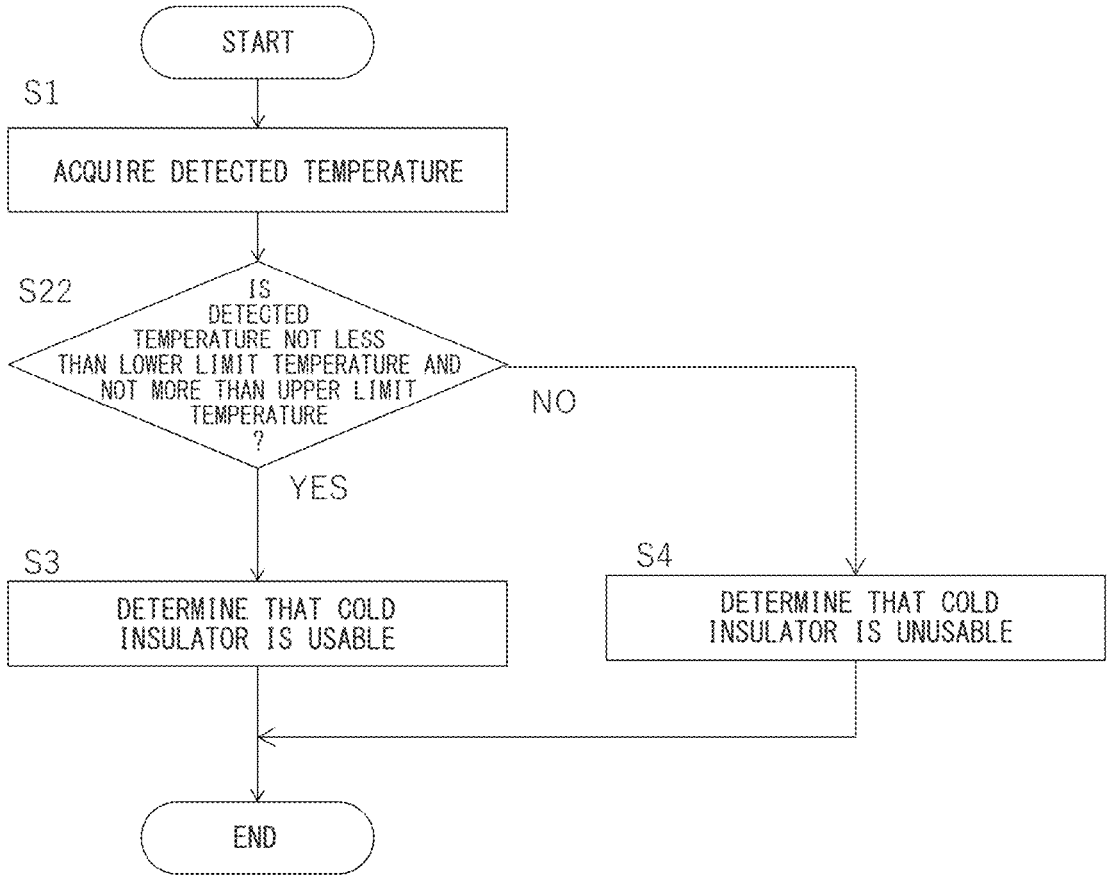
FIG. 6 is a flowchart showing one example of a method of inspecting the cold insulator when a difference between a lower limit temperature and an upper limit temperature is not less than a predetermined value.

The predetermined value is a temperature by which the lower limit temperature Tl and the upper limit temperature Th can be distinguished from each other. For example, the predetermined value is 1° C. In this case, when the difference between the lower limit temperature Tl and the upper limit temperature Th is 1° C. or more, the inspection device 12 for the cold insulators 10 is controlled by the controller 61 in accordance with the flowchart shown in FIG. 6, for example. In FIG. 6, Step S22 is executed instead of Step S2 of FIG. 4.

First, after the frozen cold insulator 10 is accommodated in the cold insulation box 40 and before the article A is accommodated, the controller 61 acquires from the RF reader 50 the detected temperature and identification information of the cold insulator 10 and the identification information of the RF tag 30 which are supplied from the RF tag 30, and stores them (Step S1). Then, the controller 61 determines whether or not the detected temperature of the cold insulator 10 is not less than the lower limit temperature Tl and not more than the upper limit temperature Th (Step S22).

When the detected temperature is not less than the lower limit temperature Tl and not more than the upper limit temperature Th (Yes in Step S22), the temperature of the center of the cold insulator 10 is not less than the lowest management temperature Tf of the article A and not more than the solidification temperature Tm of the cold insulator 10. Therefore, the controller 61 determines that since the cold insulation time can be maintained while suppressing the freezing of the article A by the cold insulator 10, the cold insulator 10 is usable (Step S3).

On the other hand, when the detected temperature of the cold insulator 10 is less than the lower limit temperature Tl or is higher than the upper limit temperature Th (No in Step S22), the controller 61 determines that the cold insulator 10 is unusable (Step S4). Then, the controller 61 displays the detected temperature and identification information of the cold insulator 10 and the result of the determination on the display device 62. Thus, the user can easily inspect whether or not the cold insulator 10 is usable, regardless of the type of the cold insulator 10. Then, the controller 61 inspects all the cold insulators 10 accommodated in the cold insulation box 40, and when all the cold insulators 10 are usable, the controller 61 determines that the cold insulation box 40 is usable.

The temperature sensor 20 may detect the temperature of the cold insulator 10 plural times, and the controller 61 may inspect the cold insulator 10 based on the detected temperatures. In this case, the controller 61 may acquire the detected temperatures and compare an average value of the detected temperatures with the lower limit temperature Tl and upper limit temperature Th. When the average value is not less than the lower limit temperature Tl and not more than the upper limit temperature, the controller 61 may determine that the cold insulator 10 is usable. Or, each time the controller 61 acquires the detected temperature, the controller 61 may compare the detected temperature with the lower limit temperature Tl and the upper limit temperature Th. When the detected temperature is not less than the lower limit temperature Tl and not more than the upper limit temperature Th a predetermined number of times or more, the controller 61 may determine that the cold insulator 10 is usable.

Modified Example 3

The inspection device 12 for the cold insulators 10 according to Modified Example 3 is configured such that in the above embodiment and Modified Examples 1 and 2, the controller 61 uses as the detected temperature of the cold insulator 10, a temperature corrected by a pre-acquired difference or ratio between a target temperature and the detected temperature detected by the temperature sensor 20.

Figure 7:
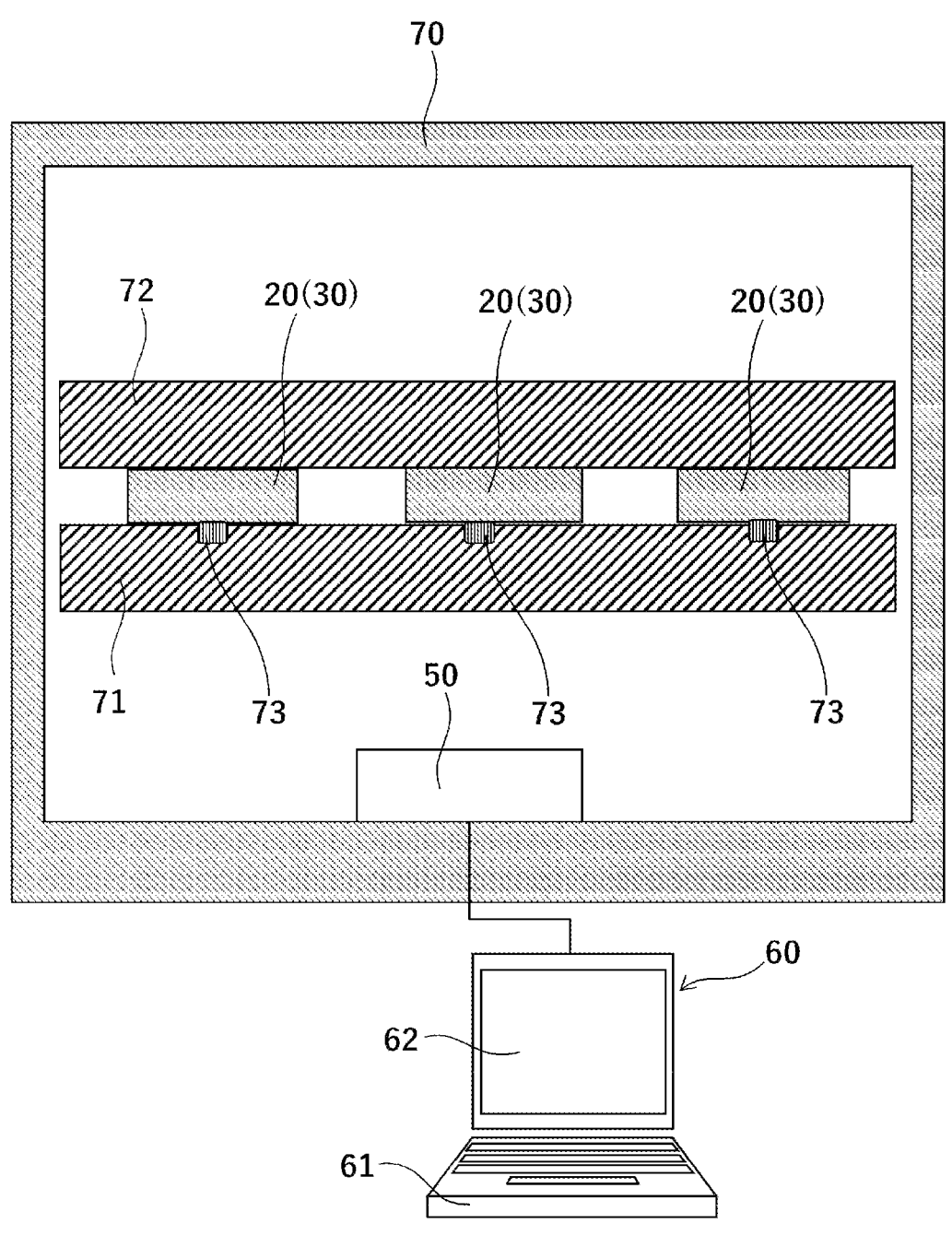
FIG. 7 is a sectional view schematically showing a device that corrects a detected temperature detected by a temperature sensor.

For example, as shown in FIG. 7, a first heat insulating member 71 and a second heat insulating member 72 are located in a thermostatic chamber 70 whose temperature has been set to 5° C. Each of the first heat insulating member 71 and the second heat insulating member 72 has a flat plate shape. The first heat insulating member 71 is located lower than the second heat insulating member 72, and an upper surface of the first heat insulating member 71 and a lower surface of the second heat insulating member 72 are opposed to each other.

The upper surface of the first heat insulating member 71 includes recesses that are recessed downward. Reference temperature sensors 73, such as calibrated thermocouples, are located in the recesses. The temperature sensors 20 and the RF tags 30 are located on the upper surface of the first heat insulating member 71 such that the temperature sensors 20 contact the reference temperature sensors 73 in the recesses. The second heat insulating member 72 is located on the temperature sensors 20 and the RF tags 30. Thus, the reference temperature sensors 73, the temperature sensors 20, and the RF tags 30 are located between the first heat insulating member 71 and the second heat insulating member 72, and influence of wind in the thermostatic chamber 70 is prevented by the first heat insulating member 71 and the second heat insulating member 72.

The reference temperature sensors 73 are electrically connected to the controller 61. Each reference temperature sensor 73 detects a temperature in the thermostatic chamber 70 and outputs the detected temperature as the target temperature to the controller 61. Moreover, each temperature sensor 20 also detects the temperature in the thermostatic chamber 70 and outputs the detected temperature and the identification information of the RF tag 30 from the RF tag 30 through the RF reader 50 to the controller 61. As above, since the reference temperature sensor 73 and the temperature sensor 20 detect the temperature of the same target, the controller 61 compares the target temperature that is the detected temperature detected by the reference temperature sensor 73 with the detected temperature detected by the temperature sensor 20. Then, the controller 61 calculates a temperature difference between the target temperature and the detected temperature or a temperature ratio of the detected temperature to the target temperature, and uses the temperature difference or the temperature ratio as a correction value of the temperature sensor 20.

For example, when the target temperature is 5.0° C., and the detected temperature is 5.5° C., the controller 61 acquires, as the correction value, the temperature ratio that is 0.909 obtained by 5.0/5.5. Moreover, when the target temperature is 5.0° C., and the detected temperature is 4.2° C., the controller 61 acquires, as the correction value, the temperature ratio that is 1.190 obtained by 5.0/4.2.

Then, the controller 61 outputs the correction values and the pieces of identification information of the RF tags 30 from the RF reader 50. Among these pieces of information, each RF tag 30 acquires the correction value including its own identification information and stores it in the tag memory 32.

At the time of the inspection of the cold insulator 10, the temperature sensor 20 and the RF tag 30 are attached to the cold insulator 10, and the cold insulator 10 is inspected by the inspection device 12. After the cold insulator 10 is accommodated in the cold insulation box 40 and before the article A is accommodated, the controller 61 transmits the acquisition signal from the RF reader 50. Upon reception of this acquisition signal, the RF tag 30 acquires the detected temperature detected by the temperature sensor 20 and transmits the detected temperature, the identification information, and the correction value. The controller 61 acquires these by the RF reader 50 and adds the correction value to the detected temperature detected by the temperature sensor 20 to correct the detected temperature. Then, the controller 61 uses the corrected detected temperature as the detected temperature of the cold insulator 10, compares the detected temperature with at least one of the upper limit temperature Th and the lower limit temperature Tl, and outputs information indicating the result of this comparison together with the identification information. For example, the controller 61 determines based on the result of the comparison whether or not the cold insulator 10 is usable, and displays the result of this determination.

As above, the correction value is acquired for each temperature sensor 20, and the detected temperature of the cold insulator 10 is corrected. Thus, the detection error Ts of the temperature sensor 20 can be made smaller than 0.5, for example, can be set to 0.1. In this case, for example, the lower limit temperature Tl is 3.1 obtained by a formula "Tl=Tf+Te+Ts," and the upper limit temperature Th is 4.3 obtained by a formula "Th=Tm−Te−Ts." Thus, the difference between the lower limit temperature Tl and the upper limit temperature Th can be made large, and the cold insulator 10 can be inspected in accordance with the flow-chart shown in FIG. 6 regardless of a method of freezing the cold insulator 10.

Instead of the temperature ratio between the target temperature and the detected temperature, the controller 61 may acquire as the correction value the temperature difference therebetween. In this case, when the target temperature is 5.0° C., and the detected temperature is 5.5° C., the controller 61 acquires as the correction value the temperature difference that is −0.5 obtained by "5.0-5.5." Moreover, when the target temperature is 5.0° C., and the detected temperature is 4.2° C., the controller 61 acquires as the correction value the temperature difference that is 0.8 obtained by "5.0-4.2." Then, the controller 61 stores the correction value and the identification information of the RF tag 30 in the RF tag 30. At the time of the inspection of the cold insulator 10, the controller 61 acquires the detected temperature detected by the temperature sensor 20, the identification information, and the correction value from the RF tag 30 through the RF reader 50, adds the correction value to the detected temperature detected by the temperature sensor 20 to correct the detected temperature detected by the temperature sensor 20, and uses the corrected detected temperature as the detected temperature of the cold insulator 10.

Moreover, as the detected temperature of the cold insulator 10, the controller 61 uses a temperature corrected by a pre-acquired correction formula. In this case, the controller 61 acquires from the RF tag 30 the detected temperature of the temperature sensor 20 located in the thermostatic chamber 70 having a temperature of 5° C., and acquires from the RF tag 30 the detected temperature of the temperature sensor 20 located in the thermostatic chamber 70 having a temperature (for example, 2° C.) other than 5° C. Then, the controller 61 acquires a linear approximation formula as the correction formula from these two detected temperatures and the target temperature that is the detected temperature detected by the reference temperature sensor 73, and stores the correction formula and the identification information of the RF tag 30 in the RF tag 30. At the time of the inspection of the cold insulator 10, the controller 61 acquires the detected temperature, the identification information, and the correction formula from the RF tag 30 through the RF reader 50. The controller 61 corrects the detected temperature by the correction formula. Thus, the detection error Ts can be made smaller.

When the detection error Ts is made smaller and negligible, each of the first value and the second value is the temperature difference Te between the temperatures of the center and surface of the cold insulator 10. In this case, the lower limit temperature Tl in the determination is represented by a formula "Tl=Tf+Te," and the upper limit temperature Th is represented by a formula "Th=Tm−Te." Then, in Step S2 of FIG. 4, Step S12 of FIG. 5, and Step S22 of FIG. 6, the controller 61 inspects the cold insulator 10 by using the lower limit temperature Tl and the upper limit temperature Th.

Modified Example 4

The inspection device 12 for the cold insulators 10 according to Modified Example 4 is configured such that in the above embodiment and Modified Examples 1 to 3, the RF tag 30 is of a passive type, and the controller 61 transmits from the RF reader 50 to the RF tag 30 a radio wave having an intensity corresponding to at least a distance between the RF tag 30 and the RF reader 50. The controller 61 may transmit from the RF reader 50 to the RF tag 30 the radio wave having an intensity which is suitable for the RF tag 30 and corresponds to factors, such as the direction of the RF tag 30 and surrounding environmental conditions, which contribute to directivity of an antenna, in addition to the intensity.

Specifically, as shown in FIG. 1, the six cold insulators 10 are located in the cold insulation box 40 so as to surround the accommodating box 47. Therefore, the distance between the RF tag 30 attached to each cold insulator 10 and the RF reader 50 that communicates with the RF tag 30 differs depending on the arrangement of the cold insulators 10. Thus, if the radio wave having a certain intensity is transmitted from the RF reader 50, the RSSI that is the intensity of the radio wave received by the RF tag 30 increases as the distance decreases. Therefore, as the RSSI of the RF tag 30 when the RF tag 30 has received the radio wave transmitted from the RF reader 50 increases, the amount of heat generated at the RF tag 30 increases, and the error of the detected temperature of the temperature sensor 20 which is transmitted by the RF tag 30.

Therefore, the controller 61 acquires the intensity of the radio wave transmitted from the RF reader 50 to the RF tag 30, in accordance with the distance between the RF tag 30 and the RF reader 50 such that the RSSI of the RF tag 30 falls within a predetermined range. Herein, a correspondence relation between the identification information of the RF tag 30 and the intensity of the radio wave transmitted from the RF reader 50 is predetermined such that: the RSSI of the RF tag 30 falls within the predetermined range; and as the distance between the RF tag 30 and the RF reader 50 increases, the intensity of the radio wave transmitted from the RF reader 50 to the RF tag 30 increases. Then, the correspondence relation is stored in the control memory 64. For example, defined as the intensity of the radio wave transmitted from the RF reader 50 are: a first intensity corresponding to a distance to the RF tag 30 of the lower cold insulator 10*d*; a second intensity corresponding to a distance to the RF tag 30 of the upper cold insulator 10*u*; a third intensity corresponding to a distance to the right cold insulator 10*r*; a fourth intensity corresponding to a distance to the left cold insulator 101; a fifth intensity corresponding to the front cold insulator 10*f*; and a sixth intensity corresponding to the rear cold insulator 10*b*.

The controller 61 transmits the radio waves of the first to sixth intensities from the RF reader 50 in the ascending order of the intensity. Then, each time the RF tag 30 receives each of the radio waves of the first to sixth intensities, the RF tag 30 transmits the RSSI of the received radio wave, the detected temperature of the cold insulator 10 which is detected by the temperature sensor 20, the identification information of the cold insulator 10, and the identification information of the RF tag 30. The RF reader 50 receives these pieces of information and outputs them to the controller 61.

In this case, the RF tag 30 receives the radio wave of the intensity corresponding to the distance between the RF tag 30 and the RF reader 50, the radio wave of the intensity lower than the above intensity corresponding to the distance, and the radio wave of the intensity higher than the above intensity corresponding to the distance. Each time the RF tag 30 receives such radio wave, the RF tag 30 transmits information, such as the detected temperature. Therefore, the controller 61 extracts information including the RSSI that falls within the predetermined range from the above pieces of information, and uses the detected temperature of this extracted information as the detected temperature of the cold insulator 10. For example, each time the RF tag 30 of the lower cold insulator 10*d* receives each of the radio waves of the first to sixth intensities, the RF tag 30 of the lower cold insulator 10*d* acquires the RSSI and transmits the RSSI, the detected temperature, and the identification information. Herein, the RSSI when the RF tag 30 has received the radio wave of the first intensity is within the predetermined range, and the RSSIs when the RF tag 30 has received the radio waves of the intensities other than the first intensity are outside the predetermined range. Therefore, from pieces of information obtained when the RF tag 30 has received the radio waves of the first to sixth intensities, the controller 61 extracts information including the RSSI obtained when the RF tag 30 has received the radio wave of the first intensity. Then, the controller 61 uses the detected temperature of this extracted information as the detected temperature of the cold insulator 10.

Since this extracted information is information obtained when the generation of heat of the RF tag 30 by the RSSI stronger than the predetermined range is suppressed, the error of the detected temperature of the temperature sensor 20 can be reduced by using the extracted information. Moreover, since the extracted information is information obtained when a situation that the temperature sensor 20 does not normally operate by the RSSI weaker than the predetermined range is suppressed, the error of the detected temperature of the temperature sensor 20 can be reduced by using the extracted information.

Moreover, by using the predetermined correspondence relation between the identification information of the RF tag 30 and the RSSI of the RF tag 30, the arrangement position of the RF tag 30 can be estimated from the RSSI of the RF tag 30. Based on the arrangement position of the RF tag 30, the RF tag of another cold insulator which is not the desired RF tag 30 and is located close to the desired RF tag 30 can be eliminated as the RF tag that is not a reading target.

The correspondence relation between the identification information of the RF tag 30 and the intensity of the radio wave of the RF reader 50 may be determined as below, for example. First, the controller 61 transmits the radio wave of a predetermined intensity from the RF reader 50 to each RF tag 30. Upon reception of the radio wave, the RF tag 30 transmits the RSSI at the time of the reception of the radio wave and the identification information of the RF tag 30 by radio waves. The controller 61 changes the intensity of the radio wave of the RF reader 50 and acquires the intensity of the radio wave transmitted from the RF reader 50 when the RSSI of the RF tag 30 which corresponds to this intensity falls within the predetermined range. Then, the controller 61 associates the intensity with the identification information of the RF tag 30 and stores them.

Moreover, the distance between the RF tag 30 and the RF reader 50 may be input from the input device 65 to the controller 61 by the user. In this case, the controller 61 associates the radio wave of the intensity corresponding to this distance with the identification information of the RF tag 30 and stores them. The distance between the RF tag 30 and the RF reader 50 and the intensity of the radio wave are prestored.

Furthermore, the controller 61 may extract the extracted information as described below. To be specific, the controller 61 acquires in advance the intensity of the radio wave transmitted from the RF reader 50 to the RF tag 30, based on the distance between the RF tag 30 and the RF reader 50 such that the RSSI of the RF tag 30 falls within the predetermined range. The controller 61 associates the intensity of this radio wave with the identification information of the RF tag 30 and stores them, and transmits the identification information of the RF tag 30 from the RF reader 50 by the radio wave of the intensity corresponding to this identification information. Upon reception of this, the RF tag 30 transmits the detected temperature, the RSSI, and the identification information. At this time, the RF tag 30 acquires not only the radio wave including its own identification information but also the radio wave for another RF tag 30. Each time the RF tag 30 acquires the radio wave, the RF tag 30 transmits the received identification information (reception identification information), the detected temperature, the RSSI, and its own identification information (transmission identification information). The controller 61 receives these pieces of information from the RF reader 50 and extracts information in which the reception identification information and the transmission identification information coincide with each other, from these pieces of information. Then, the controller 61 uses the detected temperature of this extracted information as the detected temperature of the cold insulator 10. Thus, the controller 61 can use the detected temperature obtained when the RSSI of the RF tag 30 falls within the predetermined range.

Modified Example 5

The inspection device 12 for the cold insulators 10 according to Modified Example 5 may be configured such that in the above embodiment and Modified Examples 1 to 4, as the detected temperature of the cold insulator 10, the controller 61 uses a temperature corrected based on the RSSI that is the intensity when the RF tag has received the radio wave transmitted from the RF reader 50.

Specifically, as the RSSI of the RF tag 30 increases, the amount of heat generated at the RF tag 30 increases. Therefore, the temperature of the RF tag 30 increases, and the detected temperature detected by the temperature sensor 20 connected to the RF tag 30 increases. Thus, the controller 61 acquires in advance and stores a formula of a correspondence relation between the RSSI of the RF tag 30 and the increased temperature increased by the heat generation of the RF tag 30. When this correspondence relation formula differs among the RF tags 30, a formula of a correspondence relation among the RSSI of the RF tag 30, the increased temperature increased by the heat generation of the RF tag 30, and the identification information of the RF tag 30 is stored.

The controller 61 makes the RF reader 50 transmit the radio wave of a predetermined intensity. In accordance with this, the RF tag 30 acquires the RSSI and the detected temperature detected by the temperature sensor 20 and transmits the detected temperature, the RSSI, and the identification information. The controller 61 acquires these by the RF reader 50 and acquires the increased temperature from the RSSI of the RF tag 30 based on the predetermined correspondence relation formula. Then, the controller uses, as the detected temperature of the cold insulator 10, a temperature obtained by subtracting the increased temperature from the detected temperature detected by the temperature sensor 20. Thus, by using, in Step S2 of FIG. 4, Step S12 of FIG. 5, and Step S22 of FIG. 6, the detected temperature of the cold insulator 10 which is a temperature corrected based on the RSSI, the cold insulator 10 can be inspected more accurately in a short period of time.

The correspondence relation formula between the RSSI of the RF tag 30 and the increased temperature increased by the heat generation of the RF tag 30 is acquired as below, for example. First, the controller 61 transmits the radio wave from the RF reader 50 while sweeping the intensity of the radio wave. In accordance with this, the RF tag 30 transmits the RSSI at the time of the reception of the radio wave, the detected temperature of the cold insulator 10 which is detected by the temperature sensor 20, a detected time of the cold insulator 10, and the identification information. The controller 61 acquires the correspondence relation formula that is an approximation formula from the correspondence relation between the RSSI of the RF tag 30 and the detected temperature of the temperature sensor 20 in a range from a lower limit of the RSSI of the RF tag 30 to an upper limit thereof.

The controller 61 acquires the correspondence relation between the detected temperature of the temperature sensor 20 and the detected time of the temperature sensor 20 and sets as the lower limit the RSSI of the RF tag 30 at a point at which the detected temperature has started vibrating temporally with respect to the detected time of the temperature sensor 20. Moreover, the controller 61 acquires the approximation formula from the correspondence relation between the RSSI of the RF tag 30 and the detected temperature of the temperature sensor 20 and sets as the upper limit the RSSI of the RF tag 30 at a point at which the detected temperature starts deviating from the approximation formula. Moreover, the lower limit and upper limit of the RSSI of the RF tag 30 may be predetermined. Furthermore, specifically, a suitable value of the RSSI is, for example, 15 and is acquired in advance. The lower limit may be a value that is 70% of the suitable value of the RSSI, and the upper limit may be a value that is 130% of the suitable value of the RSSI.

Moreover, in some cases, Gaussian noise of an electronic circuit is superimposed on the detected temperature of the temperature sensor 20 which is transmitted from the RF tag 30. In this case, when calculating the approximation formula, the controller 61 may use the detected temperature that coincides with a probability density distribution of a pre-acquired measurement point.

Moreover, based on an error evaluation function used to estimate the error, the controller 61 may compare "(detected temperature of temperature sensor 20)+ (error evaluation function)" with at least one of the upper limit temperature Th and the lower limit temperature Tl and determine whether or not the cold insulator 10 is usable. At this time, the "detected temperature" may be any one of an average value, intermediate value, and most frequent value of the detected temperatures of the temperature sensor 20 which are acquired from each RF tag 30 by the controller 61.

Examples of the error evaluation function include: a function of the number of times of the acquisition of the temperature; a function of the RSSI of the RF tag 30; and both of these functions. However, the error evaluation function is not limited to these. The error evaluation function can be represented by, for example, "Error evaluation function=f (the number of times of the acquisition of the temperature)+g (RSSI)+constant." However, the error evaluation function is not limited to this.

Herein, f (the number of times of the acquisition of the temperature) is represented by "f (the number of times of the acquisition of the temperature)±3σ/√the number of times of the acquisition of the temperature." Herein, σ is a standard deviation of a temperature error and may be acquired from pre-acquired temperature statistical information or may be acquired from temperature data acquired at that time. Thus, each time the controller 61 acquires the temperature, the controller 61 compares "(temperature)+ (error evaluation function)" with the upper limit temperature Th and the lower limit temperature Tl and determines whether or not the cold insulator 10 is usable. Thus, when the number of acquired pieces of data of the temperature reaches a necessary and sufficient number before the temperature is acquired a predetermined number of times, whether or not the cold insulator 10 is usable can be determined, and therefore, an inspection time of the cold insulators 10 can be shortened.

Herein, g (RSSI) is obtained by Formula 1 below. In Formula 1, "N" and "An" are constants which have been obtained in advance.

$$g(RSSI) = \sum_{n=0}^{N-1} A_n RSSI^n \qquad \text{Formula 1}$$

Typically, an error of a relational expression between the RSSI of the RF tag 30 and the increased temperature increased by the heat generation of the RF tag 30 increases as the amount of deviation of the RSSI from the suitable value increases. By estimating the error by the RSSI as above, whether or not the cold insulator 10 is usable can be determined accurately. Moreover, when the RSSI is close to the suitable value, g (RSSI) is small. Therefore, in this case, even when f (the number of times of the acquisition of the temperature) is large, the error evaluation function becomes a small value as a whole. Thus, when f (the number of times of the acquisition of the temperature) is small, a time it takes to determine whether or not the cold insulator 10 is usable can be shortened.

Modified Example 6

The inspection device 12 for the cold insulators 10 according to Modified Example 6 is configured such that in the above embodiment and Modified Examples 1 to 5, each of the first value and the second value is the detection error Ts of the temperature sensor 20.

Specifically, for example, after the cold insulators 10 are accommodated in the cold insulation box 40 and before the article A is accommodated, the cold insulators 10 in the cold insulation box 40 are inspected by the inspection device 12. In this case, the cold insulators 10 may be inspected by the inspection device 12 after a certain leaving time has elapsed since the cold insulators 10 are accommodated in the cold insulation box 40. In this leaving time, the temperature difference Te between the temperatures of the center and surface of the cold insulator 10 decreases and becomes small.

Therefore, when the temperature difference Te is negligibly small, each of the first value and the second value is the detection error Ts of the temperature sensor 20. In this case, the lower limit temperature Tl in the determination is represented by "Tl=Tf+Ts," and the upper limit temperature Th is represented by "Th=Tm−Ts." Then, in Step S2 of FIG. 4, Step S12 of FIG. 5, and Step S22 of FIG. 6, the controller 61 inspects the cold insulator 10 by using the lower limit temperature Tl and the upper limit temperature Th.

The above leaving time may be predetermined, and for example, may be set to five to ten minutes. Or, the above leaving time may be determined based on the detected temperature of the cold insulator 10. In this case, the controller 61 may acquire the detected temperature of the cold insulator 10 from the RF tag 30 through the RF reader 50 and set as the leaving time a period of time in which the time-lapse change of the detected temperature becomes not more than a predetermined temperature. Thus, for example, when the cold insulation box 40 is cooled in advance to have a temperature equal to the temperature of the cold insulator 10, a time it takes to decrease the temperature difference Te between the temperatures of the center and surface of the cold insulator 10 is short, and therefore, the cold insulator 10 can be inspected in the short leaving time.

Modified Example 7

The inspection device 12 for the cold insulators 10 according to Modified Example 7 is configured such that: in the above embodiment and Modified Examples 1 to 6, the controller 61 acquires by the RF reader 50 the pieces of information of the cold insulators 10 which are stored in the RF tags 30 in the cold insulation box 40; and the controller 61 determines based on the pieces of information of the cold insulators 10 whether or not predetermined cold insulators 10 are being accommodated in the cold insulation box 40.

Specifically, the sizes of the cold insulators 10 accommodated in the cold insulation box 40, the number of cold insulators 10 accommodated in the cold insulation box 40, and the types, such as materials, of the cold insulators 10 are associated with each other and stored in the controller 61. For example, the lower outer surface and upper outer surface of the accommodating box 47 have the same size that is a first size. The left outer surface and right outer surface of the accommodating box 47 have the same size that is a second size. The front outer surface and rear outer surface of the accommodating box 47 have the same size that is a third size. When the accommodating box 47 has a cuboid shape, the first size, the second size, and the third size are different from each other.

The size of the cold insulator 10 is equal to the size of an opposing surface of the accommodating box 47. The lower cold insulator 10$d$ and the upper cold insulator 10$u$ have the first size. The right cold insulator 10$r$ and the left cold insulator 101 have the second size. The front cold insulator 10$f$ and the rear cold insulator 10$b$ have the third size. In this case, the controller 61 stores information in which the number of cold insulators 10 of the first size is two, the number of cold insulators 10 of the second size is two, and the number of cold insulators 10 of the third size is two.

The tag memory 32 of the RF tag 30 prestores the identification information, size, and type of the cold insulator 10 to which the RF tag 30 is attached. When the cold insulator 10 is accommodated in the cold insulation box 40, the RF tag 30 transmits the identification information, size, and type of the cold insulator 10 as the information of the cold insulator 10. The RF reader 50 receives the information of the cold insulator 10 from the RF tag 30 and outputs the information to the controller 61. The controller 61 counts the numbers of cold insulators 10 accommodated in one cold insulation box 40 for the respective sizes of the cold insulators 10 and compares the counted numbers of cold insulators 10 with predetermined numbers stored in the controller 61.

When the counted numbers for the respective sizes are equal to the corresponding predetermined numbers, the controller 61 determines whether or not the types of the cold insulators 10 which are supplied from the RF reader 50 coincide with the types stored. When these coincide with each other, the controller 61 determines that the predetermined cold insulators 10 are being accommodated in the cold insulation box 40. When the counted numbers are different from the predetermined numbers, the controller 61 determines that the predetermined cold insulators 10 are not being accommodated in the cold insulation box 40. Thus, the cold insulators 10 can be prevented from being mistakenly put into the cold insulation box 40, and the cold insulators 10 can be prevented from being forgotten to be put into the cold insulation box 40.

Modified Example 8

The inspection device 12 for the cold insulators 10 according to Modified Example 8 is configured such that in the above embodiment and Modified Examples 1 to 7, based on the intensity of the radio wave which is transmitted from the RF tag 30 in the cold insulation box 40 and received by the RF reader 50, the controller 61 determines whether or not the cold insulator 10 is being accommodated in the cold insulation box 40.

For example, as shown in FIG. 1, the six cold insulators 10 are located in the cold insulation box 40 so as to surround the accommodating box 47. Therefore, the distance between the RF tag 30 attached to each cold insulator 10 and the RF reader 50 that communicates with the RF tag 30 differs depending on the arrangement of the cold insulators 10 in the cold insulation box 40. As the distance between the RF tag 30 and the RF reader 50 increases, the RSSI that is the intensity of the radio wave received by the RF reader 50 from the RF tag 30 decreases.

In this case, when the RF reader 50 receives the radio wave from the RF tag 30, the RF reader 50 acquires its RSSI and outputs it to the controller 61. When the RSSI of the RF reader 50 is less than a predetermined intensity, the controller 61 determines that the cold insulator 10 to which the RF tag 30 is attached is not being accommodated in the cold insulation box 40. Moreover, when the RSSI is not less than the predetermined intensity, the controller 61 determines that the cold insulator 10 to which the RF tag 30 is attached is being accommodated in the cold insulation box. The controller 61 counts the number of cold insulators 10 that have been determined to be being accommodated in the cold insulation box 40. Then, the controller 61 compares the counted number of cold insulators 10 with a predetermined number stored in the controller 61.

When the counted number is equal to the predetermined number, the controller 61 determines that the predetermined cold insulators 10 are being accommodated in the cold insulation box 40. When the counted number is different from the predetermined number, the controller 61 determines that the predetermined cold insulators 10 are not being accommodated in the cold insulation box 40. Thus, the cold insulators 10 can be prevented from being mistakenly put into the cold insulation box 40, and the cold insulators 10 can be prevented from being forgotten to be put into the cold insulation box 40.

The RF reader 50 may include two reader antennas 52 located so as to be spaced apart from each other. In this case, the controller 61 associates the positions and pieces of identification information of the two reader antennas 52 with each other and prestores them. The controller 61 makes the RF reader 50 transmit the pieces of identification information of the two reader antennas 52 in order by the radio waves from the two reader antennas 52. In accordance with this, the RF tag 30 acquires the RSSIs of the two reader antennas 52 when the RF tag 30 has received the radio waves from the reader antennas 52. Then, the RF tag 30 transmits the RSSIs, its own identification information, and the pieces of identification information of the reader antennas 52 that have transmitted the radio waves. The controller 61 receives these pieces of information by the RF reader 50 and acquires positions corresponding to the pieces of identification information of the two reader antennas 52 and the RSSIs of the RF tags 30 when the radio waves are transmitted from the reader antennas 52. Based on these, the controller 61 acquires the distances of the RF tags 30. When the distance of the RF tag 30 is larger than a predetermined distance, the controller 61 may determine that the cold insulator 10 to which the RF tag 30 is attached is not being accommodated in the cold insulation box 40. When the distance of the RF tag 30 is not more than the predetermined distance, the controller 61 determines that the cold insulator 10 to which the RF tag 30 is attached is being accommodated in the cold insulation box 40.

Modified Example 9

The inspection device 12 for the cold insulators 10 according to Modified Example 9 is configured such that in the above embodiment and Modified Examples 1 to 8, the controller 61 determines the state of the cold insulator 10 based on the intensity RSSI of the radio wave received by the RF tag 30 in the cold insulation box 40.

Figure 8:
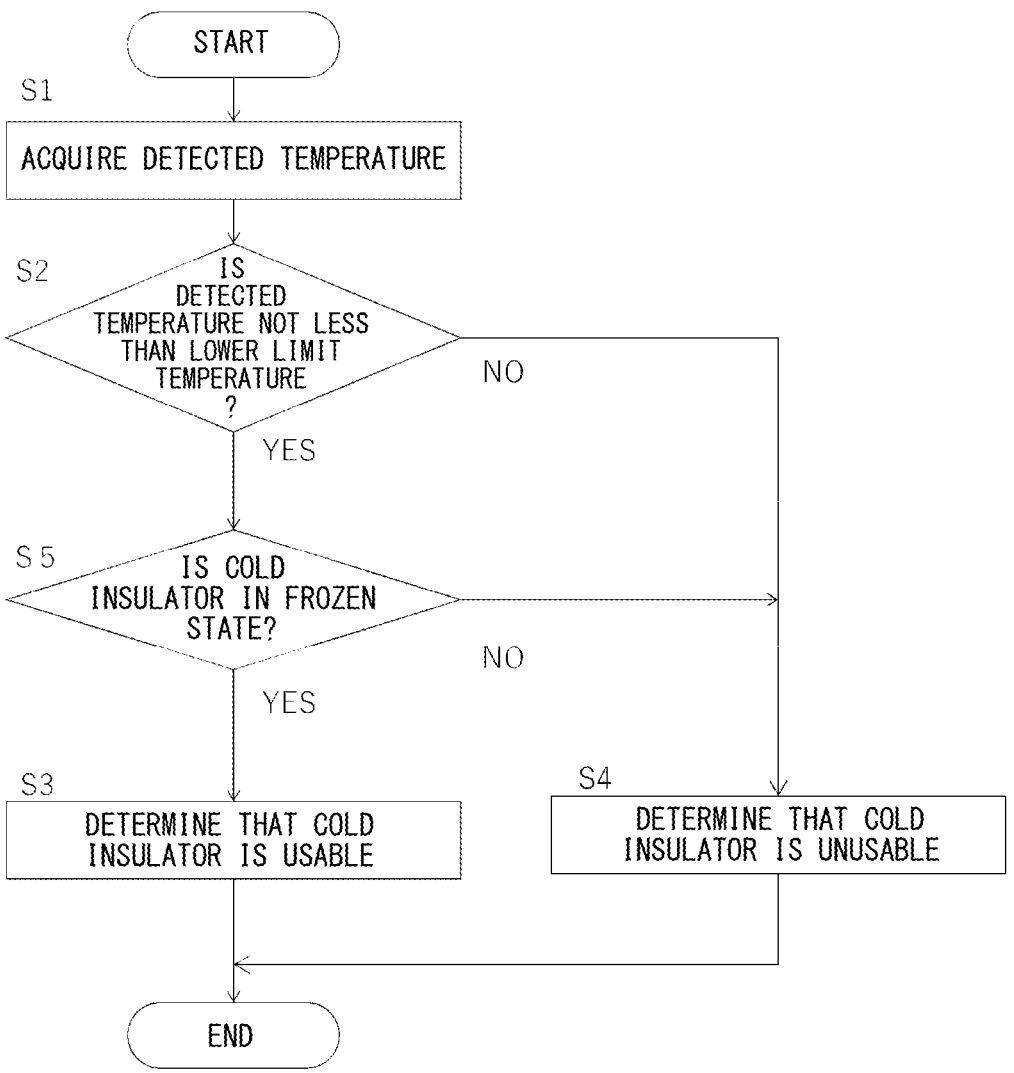
FIG. 8 is a flowchart showing one example of a method of inspecting the cold insulator according to Modified Example 9.

Specifically, the controller 61 inspects the cold insulator 10 in accordance with the flowchart shown in FIG. 8. In FIG. 8, Step S5 is executed between Steps S2 and S3 of FIG. 4. When comparing the detected temperature of the cold insulator 10 with the upper limit temperature Th, Step S5 is executed between Steps S12 and S3 of FIG. 5. Moreover, when comparing the detected temperature of the cold insulator 10 with the lower limit temperature Tl and the upper limit temperature Th, Step S5 is executed between Steps S22 and S3 of FIG. 6.

In Step S2 of FIG. 8, when the detected temperature is not less than the lower limit temperature Tl (Yes in Step S2), the controller 61 determines based on the RSSI of the RF reader 50 whether or not the cold insulator 10 is in a frozen state (Step S5). The RSSI that is the intensity of the radio wave received by the RF reader 50 from the RF tag 30 depends on a permittivity of the cold insulator 10 to which the RF tag 30 is attached. The permittivity changes depending on whether the state of the cold insulator 10 is a frozen state or a molten state.

For example, the RSSI of the RF reader 50 from the RF tag 30 attached to the frozen cold insulator 10 is smaller than the RSSI of the RF reader 50 from the RF tag 30 attached to the molten cold insulator 10. A relative permittivity of molten liquid water is about 80, whereas a relative permittivity of frozen ice is 4.2. Therefore, a correspondence relation between the state of the cold insulator 10 and the RSSI of the RF reader 50 is prestored in the controller 61.

When the controller 61 transmits the radio wave of the acquisition signal from the RF reader 50, the RF tag 30 outputs the RSSI at the time of the reception of this radio wave and the identification information of the RF tag 30 by radio waves. Based on the correspondence relation between the state of the cold insulator 10 and the RSSI, the controller 61 determines from the RSSI of the RF reader 50 whether or not the cold insulator 10 is in a frozen state. When the cold insulator 10 is in a frozen state (Yes in Step S2), the controller 61 determines that the cold insulator 10 is usable (Step S3). On the other hand, when the cold insulator 10 is in a molten state (No in Step S2), the controller 61 determines that the cold insulator 10 is unusable (Step S4).

As above, the state of the cold insulator 10 can be more accurately determined based on the RSSI of the RF tag 30 in addition to the detected temperature of the cold insulator 10 which is detected by the temperature sensor 20. Therefore, it is possible to avoid a case where a large error is caused in the detected temperature of the temperature sensor 20 due to, for example, the failure of the temperature sensor, and the cold insulator 10 in a molten state is mistakenly used. The controller 61 may associate the state of the cold insulator 10 with the identification information of the cold insulator 10 and display them on the display device 62.

The controller 61 may calibrate the detected temperature of the temperature sensor 20 based on a phase transition point of the cold insulator 10. Specifically, for example, the cold insulator 10 to which the temperature sensor 20 and the RF tag 30 are attached is placed in the refrigerator or the temperature-controlled warehouse such that wind is prevented from hitting the temperature sensor 20 by a wall or the like. Moreover, the RF reader 50 or its reader antenna 52 is located inside or in the vicinity of the refrigerator or the temperature-controlled warehouse. Then, the controller 61 acquires from the RF tag 30 through the RF reader 50 the temperature of the cold insulator 10 which is detected by the temperature sensor 20. The controller 61 acquires the phase transition point of the cold insulator 10 from the time change of the detected temperature detected by the temperature sensor 20. The phase transition point of the cold insulator 10 is predetermined in accordance with the material of the cold insulator 10 and does not change with time. Therefore, the controller 61 calibrates the detected temperature of the temperature sensor 20 in accordance with a difference between a predetermined phase transition point of the cold insulator 10 and the phase transition point of the cold insulator 10 which is based on the detected temperature detected by the temperature sensor 20. As above, the detected temperature detected by the temperature sensor 20 can be regularly calibrated without returning the temperature sensor 20 to a manufacturer or the like. When the frozen cold insulator 10 is being accommodated in the cold insulation box 40, the controller 61 may acquire the phase transition point (melting point) at which the cold insulator 10 melts, from the time-lapse change of the detected temperature detected by the temperature sensor 20. Then, the controller 61 may calibrate the temperature of the RF tag 30 based on the difference between this phase transition point and the predetermined phase transition point of the cold insulator 10.

Modified Example 10

The inspection device 12 for the cold insulators 10 according to Modified Example 10 is configured such that in the above embodiment and Modified Examples 1 to 9, when the controller 61 determines based on the result of the comparison that the cold insulator 10 is usable, the controller 61 updates the number of times of the use of the cold insulator 10 and stores it in the RF tag 30.

For example, the RF tag 30 stores the number of times of the use of the cold insulator 10 in the tag memory 32. Then, in Step S3 of FIGS. 4, 5, and 6, when the controller 61 determines that the cold insulator 10 is usable, the controller 61 transmits use information of the cold insulator 10 and the identification information of the RF tag 30 from the RF reader 50 to the RF tag 30.

When the RF tag 30 receives the use information of the cold insulator 10 which includes its own identification information, and the RF tag 30 increases the number of times of the use by one and updates the number of times of the use in the tag memory 32. Then, when the RF tag 30 receives acquisition information from the RF reader 50 at the time of the inspection for the next usage, the RF tag 30 transmits to the RF reader 50 the detected temperature of the cold insulator 10 which is detected by the temperature sensor 20, the identification information of the cold insulator 10 and the number of times of the use of the cold insulator 10 which are stored in the tag memory 32, and the identification information of the RF tag 30. The RF reader 50 outputs these pieces of information to the controller 61.

The controller 61 displays the identification information of the cold insulator 10 and the number of times of the use of the cold insulator 10 on the display device 62. Thus, based on the number of times of the use of the cold insulator 10, the user can plan whether to perform maintenance of the cold insulator 10, whether to replace the cold insulator 10 with a new one, and the like.

Other Modified Examples

In the above embodiment and all the modified examples, the temperature sensor 20 detects the temperature of the cold insulator 10 by being operated by electric power generated when the RF tag 30 receives the radio wave from the RF reader 50. However, the temperature sensor 20 may include a battery and detect the temperature of the cold insulator 10 by being operated by electric power supplied from the battery.

The above embodiments may be combined with each other as long as they do not exclude each other. From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure.

INDUSTRIAL APPLICABILITY

The inspection device for the cold insulator and the inspection system for the cold insulator according to the present disclosure are useful as the inspection device for the cold insulator and the inspection system for the cold insulator by each of which a vacuum heat insulating body having a predetermined heat insulation property can be continuously used.

REFERENCE SIGNS LIST

10 cold insulator
11 inspection system
12 inspection device
20 temperature sensor
30 RF tag
40 cold insulation box
50 RF reader
61 controller

The invention claimed is:

1. An inspection device for a cold insulator,
the inspection device comprising:
a RF reader that is configured to receive from a RF tag a detected temperature of a cold insulator in a cold insulation box, the detected temperature being detected by a temperature sensor attached to a surface of the cold insulator; and
a controller, wherein
the controller is configured to output information indicating a result of comparison between
at least one of a lower limit temperature obtained by adding a predetermined first value to a lowest management temperature of an article that is kept cold in the cold insulation box and an upper limit temperature obtained by subtracting a predetermined second value from a solidification temperature of the cold insulator and
the detected temperature of the cold insulator which has been received by the RF reader, and
when the article is kept cold in the cold insulation box within a cold insulation temperature range including the lowest management temperature as a lower limit, and the cold insulator is a first cold insulator which has been cooled in an environment of a first temperature lower than the cold insulation temperature range and the solidification temperature of the cold insulator and then has been adjusted in temperature in an environment of a second temperature that is within the cold insulation temperature range, the controller is configured to output information indicating whether the detected temperature of the first cold insulator is not less than the lower limit temperature; and
when the article is kept cold in the cold insulation box within the cold insulation temperature range including the lowest management temperature as the lower limit, and the cold insulator is a second cold insulator which has been cooled in an environment of a third temperature that is within the cold insulation temperature range and is not more than the solidification temperature of the cold insulator, the controller is configured to output information indicating whether the detected temperature of the second cold insulator is not more than the upper limit temperature.

2. The inspection device according to claim 1, wherein each of the first value and the second value is at least one of a temperature difference between temperatures of a center and surface of the cold insulator, a detection error of the temperature sensor, and a value obtained by adding the temperature difference to the detection error.

3. The inspection device according to claim 1, wherein as the detected temperature of the cold insulator, the controller is configured to use a temperature corrected by a pre-acquired difference or ratio between a target temperature and the detected temperature detected by the temperature sensor.

4. The inspection device according to claim 1, wherein as the detected temperature of the cold insulator, the controller is configured to use a temperature corrected based on an intensity of a radio wave when the RF tag has received the radio wave transmitted from the RF reader.

5. The inspection device according to claim 1, wherein:
the RF tag is of a passive type; and
the controller is configured to transmit from the RF reader to the RF tag a radio wave having an intensity corresponding to at least a distance between the RF tag and the RF reader.

6. The inspection device according to claim 1, wherein:
the controller is configured to acquire from the RF reader information of the cold insulator stored in the RF tag in the cold insulation box; and
the controller is configured to determine, based on the information of the cold insulator, whether the predetermined cold insulator is being accommodated in the cold insulation box.

7. The inspection device according to claim 1, wherein based on an intensity of a radio wave which has been transmitted from the RF tag in the cold insulation box and received by the RF reader, the controller is configured to determine whether the cold insulator is being accommodated in the cold insulation box.

8. The inspection device according to claim 1, wherein based on an intensity of a radio wave which has been received by the RF tag in the cold insulation box, the controller is configured to determine a state of the cold insulator.

9. The inspection device according to claim 1, wherein the controller is configured so that when the controller determines based on the result of the comparison that the cold insulator is usable, the controller updates the number of times of the use of the cold insulator and stores the number of times of the use in the RF tag.

10. An inspection system for a cold insulator, the inspection system comprising:
a temperature sensor that detects the temperature of the cold insulator accommodated in the cold insulation box;

a RF tag that transmits the detected temperature of the cold insulator which is detected by the temperature sensor; and the inspection device according to claim 1.

11. An inspection device for a cold insulator, the inspection device comprising:

an RF reader that is configured to receive from a RF tag a detected temperature of a cold insulator in a cold insulation box, the detected temperature being detected by a temperature sensor attached to a surface of the cold insulator; and a controller, wherein the controller is configured to output information indicating a result of comparison between at least one of a lower limit temperature obtained by adding a predetermined first value to a lowest management temperature of an article that is kept cold in the cold insulation box and an upper limit temperature obtained by subtracting a predetermined second value from a solidification temperature of the cold insulator and the detected temperature of the cold insulator which has been received by the RF reader, and when a difference between the lower limit temperature and the upper limit temperature is not less than a predetermined value, the controller is configured to output information indicating whether the detected temperature of the cold insulator is not less than the lower limit temperature and not more than the upper limit temperature.

12. The inspection device according to claim 11, wherein each of the first value and the second value is at least one of a temperature difference between temperatures of a center and surface of the cold insulator, a detection error of the temperature sensor, and a value obtained by adding the temperature difference to the detection error.

13. The inspection device according to claim 11, wherein as the detected temperature of the cold insulator, the controller is configured to use a temperature corrected by a pre-acquired difference or ratio between a target temperature and the detected temperature detected by the temperature sensor.

14. The inspection device according to claim 11, wherein as the detected temperature of the cold insulator, the controller is configured to use a temperature corrected based on an intensity of a radio wave when the RF tag has received the radio wave transmitted from the RF reader.

15. The inspection device according to claim 11, wherein:

the RF tag is of a passive type; and the controller is configured to transmit from the RF reader to the RF tag a radio wave having an intensity corresponding to at least a distance between the RF tag and the RF reader.

16. The inspection device according to claim 11, wherein:

the controller is configured to acquire from the RF reader information of the cold insulator stored in the RF tag in the cold insulation box; and the controller is configured to determine, based on the information of the cold insulator, whether the predetermined cold insulator is being accommodated in the cold insulation box.

17. The inspection device according to claim 11, wherein based on an intensity of a radio wave which has been transmitted from the RF tag in the cold insulation box and received by the RF reader, the controller is configured to determine whether the cold insulator is being accommodated in the cold insulation box.

18. The inspection device according to claim 11, wherein based on an intensity of a radio wave which has been received by the RF tag in the cold insulation box, the controller is configured to determine a state of the cold insulator.

19. The inspection device according to claim 11, wherein the controller is configured so that, when the controller determines based on the result of the comparison that the cold insulator is usable, the controller updates the number of times of the use of the cold insulator and stores the number of times of the use in the RF tag.

20. An inspection system for a cold insulator, the inspection system comprising:

a temperature sensor that detects the temperature of the cold insulator accommodated in the cold insulation box;

a RF tag that transmits the detected temperature of the cold insulator which is detected by the temperature sensor; and the inspection device according to claim 11.

* * * * *